(12) United States Patent
Eder et al.

(10) Patent No.: US 11,657,419 B2
(45) Date of Patent: May 23, 2023

(54) SYSTEMS AND METHODS FOR BUILDING A VIRTUAL REPRESENTATION OF A LOCATION

(71) Applicant: Yembo, Inc., San Diego, CA (US)

(72) Inventors: Marc Eder, San Diego, CA (US); Siddharth Mohan, San Diego, CA (US); Maciej Halber, San Diego, CA (US); Anoop Jakka, San Diego, CA (US); Devin Waltman, San Diego, CA (US); Zachary Rattner, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 91 days.

(21) Appl. No.: 17/194,075

(22) Filed: Mar. 5, 2021

(65) Prior Publication Data
US 2021/0279957 A1    Sep. 9, 2021

Related U.S. Application Data

(60) Provisional application No. 62/986,061, filed on Mar. 6, 2020.

(51) Int. Cl.
*G06T 7/50* (2017.01)
*G06T 7/20* (2017.01)
(Continued)

(52) U.S. Cl.
CPC ..... *G06Q 30/0205* (2013.01); *G06F 3/04842* (2013.01); *G06F 16/29* (2019.01);
(Continued)

(58) Field of Classification Search
None
See application file for complete search history.

(56) References Cited

U.S. PATENT DOCUMENTS 9,978,033 B1    5/2018  Payne et al.
10,289,760 B1   5/2019  Oakes, III et al.
(Continued)

FOREIGN PATENT DOCUMENTS

KR    10-2019-0117354 A    10/2019
WO       2019-016685 A1     1/2019
WO       2019-191329 A1    10/2019

OTHER PUBLICATIONS

Patent Cooperation Treaty, International Search Report issued in PCT/IB2021/051875, dated Jun. 10, 2021, pp. 1-3.
(Continued)

*Primary Examiner* — Yanna Wu
(74) *Attorney, Agent, or Firm* — Pillsbury Winthrop Shaw Pittman LLP

(57) ABSTRACT

Systems, methods, and non-transitory computer readable media are disclosed that include operations to generate a virtual representation of a physical location with spatially localized information related to elements within the location being embedded in the virtual representation. The operations includes receiving description data (e.g., a plurality of images and videos) of the location, the description data being generated via at least one of a camera, a user interface; receive metadata associated elements within the location; generating (e.g., offline or in real-time), via a machine learning model and/or a geometric model, a 3-dimensional (3D) model of the location and elements therein; and generating, based on the 3D model of the location, an information-rich virtual representation of the location by annotating the 3D model with spatially localized metadata associated with the elements within the location and semantic information of the elements.

32 Claims, 28 Drawing Sheets

(51) Int. Cl.

| | | |
|---|---|---|
| *G06Q 30/0204* | (2023.01) | |
| *G06Q 40/08* | (2012.01) | |
| *G06F 16/29* | (2019.01) | |
| *G06N 20/00* | (2019.01) | |
| *G06Q 10/0875* | (2023.01) | |
| *G06Q 10/0639* | (2023.01) | |
| *G06T 7/00* | (2017.01) | |
| *G06Q 30/0201* | (2023.01) | |
| *G06N 3/08* | (2023.01) | |
| *G06T 17/00* | (2006.01) | |
| *G06T 7/80* | (2017.01) | |
| *G06F 3/04842* | (2022.01) | |
| *G06T 17/20* | (2006.01) | |
| *G06V 20/00* | (2022.01) | |
| *G06N 3/044* | (2023.01) | |
| *H04N 23/63* | (2023.01) | |
| *G06V 10/764* | (2022.01) | |
| *G06V 10/82* | (2022.01) | |
| *G06V 20/64* | (2022.01) | |
| *G01S 17/06* | (2006.01) | |
| *G06Q 50/16* | (2012.01) | |
| *G01S 19/42* | (2010.01) | |
| *G06F 18/24* | (2023.01) | |

(52) U.S. Cl.
CPC ............... *G06N 3/044* (2023.01); *G06N 3/08* (2013.01); *G06N 20/00* (2019.01); *G06Q 10/06395* (2013.01); *G06Q 10/0875* (2013.01); *G06Q 30/0206* (2013.01); *G06Q 40/08* (2013.01); *G06T 7/0002* (2013.01); *G06T 7/20* (2013.01); *G06T 7/50* (2017.01); *G06T 7/80* (2017.01); *G06T 17/00* (2013.01); *G06T 17/20* (2013.01); *G06V 10/764* (2022.01); *G06V 10/82* (2022.01); *G06V 20/00* (2022.01); *G06V 20/64* (2022.01); *H04N 23/631* (2023.01); *G01S 17/06* (2013.01); *G01S 19/42* (2013.01); *G06F 18/24* (2023.01); *G06Q 50/16* (2013.01); *G06T 2207/20081* (2013.01)

(56) References Cited

U.S. PATENT DOCUMENTS

| | | |
|---|---|---|
| 10,325,485 B1 | 6/2019 | Schuster |
| 10,515,486 B1 | 12/2019 | Chavez et al. |
| 2010/0214284 A1 | 8/2010 | Rieffel et al. |
| 2015/0073834 A1 | 3/2015 | Gurenko et al. |
| 2015/0294499 A1 | 10/2015 | Wagner et al. |
| 2017/0206648 A1 | 7/2017 | Marra et al. |
| 2017/0221152 A1 | 8/2017 | Nelson et al. |
| 2018/0069932 A1 | 3/2018 | Tiwari et al. |
| 2019/0012804 A1* | 1/2019 | Wang ................... H04N 13/243 |
| 2019/0114717 A1 | 4/2019 | Labrie et al. |
| 2019/0147220 A1* | 5/2019 | McCormac ............ G06V 20/64 |
| | | 382/103 |
| 2019/0188797 A1 | 6/2019 | Przechocki et al. |
| 2019/0220793 A1 | 7/2019 | Saarenvirta |
| 2019/0236732 A1* | 8/2019 | Speasl ................... H04L 9/3247 |
| 2019/0295011 A1 | 9/2019 | Shi et al. |
| 2020/0094405 A1* | 3/2020 | Davidson ............... B25J 9/1697 |
| 2020/0151963 A1 | 5/2020 | Lee et al. |
| 2020/0167695 A1 | 5/2020 | Buesser |

OTHER PUBLICATIONS

Patent Cooperation Treaty, International Search Report issued in PCT/IB2021/051869, dated Jun. 9, 2021, pp. 1-4.

Patent Cooperation Treaty, International Search Report issued in PCT/IB2021/051878, dated Jun. 4, 2021, pp. 1-4.

Nesterov, "Lectures on Convex Optimization", 2nd. Ed., Springer, 2018, p. xiii (Introduction), vol. 137.

United States Patent and Trademark Office, Non-Final Office Action issued in U.S. Appl. No. 17/193,957, filed Nov. 30, 2022, pp. 1-7.

Besl et al., "A Method for Registration of 3-D Shapes", IEEE Transactions on Pattern Analysis and Machine Intelligence, pp. 239-256, Feb. 1992, vol. 14(2).

Fischler et al., "Random sample consensus: a paradigm for model fitting with applications to image analysis and automated cartography", Communications of the AMC, Jun. 1981, pp. 381-395, vol. 24.

Garland et al., "Surface simplification using quadric error metrics", Proceedings of the 24th annual conference on Computer graphics and interactive techniques, 1997, pp. 1-8.

Hoppe, "Progressive meshes", Proceedings of the 23rd annual conference on Computer graphics and interactive techniques, 1996, pp. 99-108.

Kalvin et al., "Superfaces: Polygonal mesh simplification with bounded error", IEEE Computer Graphics and Applications, 1996, pp. 64-77, vol. 16(3).

Levy et al., "Least squares conformal maps for automatic texture atlas generation", ACM transactions on graphics (TOG), 2002, pp. 362-371, vol. 21.(3).

Lorensen et al., "Marching cubes: A high resolution 3D surface construction algorithm", ACM siggraph computer graphics, 1987, pp. 163-169, vol. 21(4).

* cited by examiner

SYSTEMS AND METHODS FOR BUILDING A VIRTUAL REPRESENTATION OF A LOCATION

CROSS REFERENCE TO RELATED APPLICATIONS

This application is based on, and claims the benefit of priority to, provisional application numbers 62/986,061, filed Mar. 6, 2020, the entire contents of which are incorporated herein by reference.

FIELD OF THE DISCLOSURE

This disclosure relates to systems and methods for providing artificial intelligence based virtual representation of a location enriched with spatially localized details.

BACKGROUND

Myriad tasks for home services revolve around an accurate 3-dimensional spatial and semantic understanding of a location such as a home. Planning renovations requires understanding the current state of the home, filing an insurance claim requires accurate documentation and measurements of damages, and moving into a new home requires a reliable estimate as to whether one's belongings and furniture will fit. Currently, the best ways to achieve the requisite 3-dimensional spatial and semantic understanding involves manual measurements, hard-to-acquire architectural drawings, and arrangements with multiple parties with competing schedules and interests.

A simplified and more user friendly system for capturing images and videos of a location, and generating accurate virtual representations based on the captured images and videos is needed. For example, a system that can use the images and videos to automatically generate virtual representations is desired. Further, means for interacting with the virtual representation is needed to enable the user to easily extract, or modify desired information about the location or items at the location.

SUMMARY

Systems, methods, and computer program products are disclosed that include receiving data of a location in a form of e.g., images, a video feed from a client device configured to be controlled by a user. The received data serves as an input to a model (e.g., an artificial intelligence (AI)-based model such as a machine learning model) configured to generate virtual representation of the location enriched with spatially localized details about elements of the location. The virtual representation can be used for various purposes.

The present disclosure provides a system that resolves several impediments in existing 3-dimensional (3D) visualization systems by creating a virtual representation of a location, and enabling this representation to be a platform for collaborative interaction for services and/or tasks to be performed by a user. The virtual representation includes a 3D model of the location that is appropriately textured to match the corresponding location, annotated to describe elements of the location on the 3D model, and associated with metadata such as audio, visual, geometric, and natural language media that can be spatially localized within the context of the 3D model. Furthermore, comments and notes may also be associated with the 3D model of the location. The system enables multiple users to synchronously or asynchronously utilize the virtual representation to collaboratively inspect, review, mark up, augment, and otherwise analyze the location entirely through one or more electronic devices (e.g., a computer, a phone, a tablet, etc.) in order to perform desired services and/or tasks at the location.

Existing capture processes can be tedious and unintuitive, as there are often many considerations that need to be taken into account. For example, considerations such as lighting conditions, surface materials and patterns, and different types of camera motion. Existing automated solutions for constructing a 3D model often ask users to take panoramic data (e.g., in the form of images or a video) with strong constraints as to how much a camera is allowed to move and where a user should stand. For example, some existing methods seek to estimate room layouts from panoramic images that capture a $47\pi$ steradian field of view. Capturing these panoramic images typically require specialized camera hardware. Alternatively, the panoramic images can be stitched from a number of standard, perspective camera images captured without translation (e.g. assuming the camera is only rotating about an axis, as if on a tripod). While panoramic image stitching methods often leave few noticeable visual artifacts for outdoor scenes with far away content, the same methods typically fare worse for indoor scenes, as indoor scenes typically comprise objects and structures that are closer to the camera compared to objects and structures found in outdoor scenes. As such, any slight translation of the camera (e.g. a shaky hand) during image capture can introduce artifacts in a stitched image due to parallax. Furthermore, these panoramic approaches limit the reconstruction to a single vantage point, which can result in more viewpoint occlusion (e.g. a couch obstructs the view of the camera to see beyond it). Other 3D reconstruction methods may allow the user to move freely about the space, but they often fail in indoor scenes due to their reliance on identifying repeatable salient features (e.g. points or image patches) across multiple frames. Common aspects of indoor environments, such as large textureless regions (e.g. blank walls), multiple light sources casting viewpoint-dependent shadows, and transparent and specular surfaces (e.g. windows and mirrors), are well-known failure cases for these 3D reconstruction solutions. As such, a user has to spend extra time and resources to prepare an indoor scene properly and significantly constrain the panoramic data capture process. Alternatively, other existing approaches that use images or a video rely heavily on manual inputs, such as requiring a user to manually identify corners, doors, windows, and other structures in an indoor space in order to generate a layout (e.g., a floor plan) of the location. Using the layout, a 3D model may be constructed by applying an operation such as extrusion to the layout. However, these manual steps can require time, effort, and training for the user, which can make capturing large or complex indoor environments prohibitive.

The system herein simplifies the capture process and reduces a number of constraints (e.g., restrictions on camera movements, user positions, lighting conditions, etc.) that the user may follow during capturing the images and videos. Furthermore, the system enables the user to receive audio, visual, and natural language feedback in real-time that guides the user on how to capture images or videos of the location in order to construct a high-quality 3D model.

In some applications, the system herein avoids the necessity of the user to physically visit the location and perform a visual assessment related to the services to be provided. Many times, the user providing a consultation may not be sufficiently skilled at capturing data, image and videos of the location and as such, repeated consultations may be needed for clarification or to fix mistakes.

According to an aspect of the present disclosure, a system is configured to generate a virtual representation of a location with spatially localized information of elements within the location being embedded in the virtual representation. The system comprising one or more hardware processors configured by machine-readable instructions to: receive description data of a location, the description data being generated via at least one of a camera, a user interface, an environment sensor, and an external location information database, the description data comprising a plurality of images, and pose matrices; receive metadata associated elements within the location; generate (e.g., in real-time or offline), via a machine learning model and/or a geometric model, a 3-dimensional (3D) representation of the location and elements therein, the machine learning model being configured to receive the plurality of image and pose matrices as inputs and predict geometry of the location and the elements therein to form the 3D model; and generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata.

Furthermore, according to another aspect of the present disclosure, a system is configured to generate a virtual representation of a location with spatially localized information of elements within the location being embedded in the virtual representation. The system comprising one or more hardware processors configured by machine-readable instructions to: receive description data of a location, the description data being generated via at least one of a camera, a user interface, an environment sensor, and an external location information database, the description data comprising a plurality of images; generate, via a machine learning model and/or a geometric model, a 3-dimensional (3D) representation of the location and elements therein, the machine learning model being configured to receive the plurality of image as input and predict geometry of the location and the elements therein to form the 3D model; obtain, via a database or a user, heuristic information associated with one or more elements detected within the location, the heuristic information comprising dimension data associated with an element; estimate, based on the heuristic information and geometric correlation between the plurality of images, a scale factor for adjusting sizes of the elements in the images; estimate, based on the scale factor, dimensions of the elements within the location; and update, based on the estimated scale factor and the estimated dimensions, the virtual representation of the location by adjusting sizes of the elements within the location and annotating the 3D model with estimated dimensions of the elements of the location.

Implementations of the current subject matter can include, but are not limited to, methods consistent with the descriptions provided herein as well as articles that comprise a tangibly embodied machine-readable medium (e.g., a non-transitory computer readable medium) operable to cause one or more machines (e.g., computers, etc.) to perform operations implementing one or more of the described features. Similarly, computer systems are also contemplated that may include one or more processors, and one or more memory modules coupled to the one or more processors. A memory module, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system, or across multiple computing systems. Such multiple computing systems can be connected and can exchange data and/or commands or other instructions, or the like via one or more connections, including, but not limited, to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
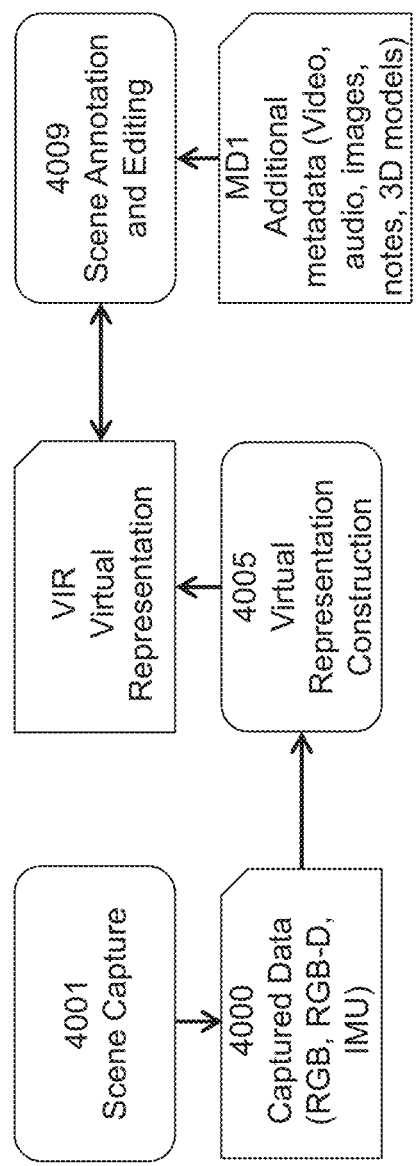
FIG. 1 is a block diagram providing a high level overview of components and functions of system(s) and method(s), according to some embodiment.

The manual entry of information relating to a task (e.g., entering data into a computer system) can be tedious and imprecise. The disclosed systems and methods automate the generation and entry of information relevant to a task without requiring user input. The automation enabled by the present disclosure utilizes machine learning, object detection from video or images, semantic segmentation, sensors, and other related technology. For example, information related to the detected objects can be automatically determined and populated as data into a virtual representation of a location.

As used herein, several terms used in the present disclosure are discussed below to improve the understanding of concepts of the present disclosure. "CAD model" refers to a 3D model of a structure, object, or geometric primitive that has been manually constructed or improved using computer-aided design (CAD) tools. "Extrinsics matrix" refers to a matrix representation of the rigid-body transformation between a fixed 3-dimensional Cartesian coordinate system defining the space of a virtual world and a 3-dimensional Cartesian coordinate system defining that world from the viewpoint of a specific camera. "Inertial measurement unit" (IMU) refers to a hardware unit comprising accelerometers, gyroscopes, and magnetometers that can be used to measure the motion of a device in physically-meaningful units. "Intrinsics matrix" refers to a matrix representation of physical attributes of a real camera comprising focal length, principal point, and skew. "Point cloud" refers to a collection of 3-dimensional points, wherein each point has information comprising 3D position, color information, and surface normal information, among other pertinent data. "Mesh" refers to an explicit representation of a 3D surface consisting of vertices connected by edges. The vertices comprise the same information as a 3D point cloud, with the possible addition of texture coordinates, while the edges define planar surfaces called faces, typically triangular or quadrilateral, which themselves may comprise color information, surface normals, among other pertinent data. "Multi-layer perceptron" (MLP) refers to a type of feed-forward neural network which models a network as a series of one or more nonlinear weighted aggregations of data. Typically, these networks comprise sequential layers of aggregations with varying dimensionality. This class of algorithms are generally considered to be able to approximate any mathematical function. "Convolutional neural network" (CNN) refers to a particular neural network having an input layer, hidden layers, and an output layer and configured to perform a convolution operation. The hidden layers (also referred as convolutional layers) convolve the input and pass its result to the next layer. "Pose matrix" refers to a matrix representation of a camera's relative or absolute orientation in the virtual world, comprising the 3-degrees-of-freedom rotation of the camera, and the 3-degrees-of-freedom position of the camera in the world. This is the inverse of the extrinsics matrix. The pose may refer to a combination of position and orientation or orientation only. "Posed image" refers to an RGB or RGB-D image with associated information describing the capturing camera's relative orientation in the world, comprising the intrinsics matrix and one of the pose matrix or extrinsics matrix. "RGB image" refers to a 3-channel image representing a view of a captured scene using a color space, wherein the color is broken up into red, green, and blue channels. "RGB-D image" refers to a 4-channel image consisting of an RGB image augmented with a depth map as the fourth channel. The depth can represent the straight-line distance from the image plane to a point in the world, or the distance along a ray from the camera's center of projection to a point in the world. The depth information can contain unitless relative depths up to a scale factor or metric depths representing absolute scale. The term RGB-D image can also refer to the case where a 3-channel RGB image has an associated 1-channel depth map, but they are not contained in the same image file. "Signed distance function" (SDF) refers to a function that provides an implicit representation of a 3D surface, and may be stored on a voxel grid, wherein each voxel stores the distance to the closest point on a surface. The original surface can be recovered using an algorithm of the class of isosurface extraction algorithms comprising marching cubes, among others. "Structure from Motion" (SFM) refers to a class of algorithms that estimate intrinsics and extrinsic camera parameters, as well as a scene structured in the form of a sparse point cloud. SFM can be applied to both ordered image data, such as frames from a video, as well unordered data, such as random images of a scene from one or more different camera sources. Traditionally, SFM algorithms are computationally expensive and are used in an offline setting. "Simultaneous localization and mapping" (SLAM) refers to a class of algorithms that estimate both camera pose and scene structure in the form of point cloud. SLAM is applicable to ordered data, for example, a video stream. SLAM algorithms may operate at interactive rates, and can be used in online settings. "Textured mesh" refers to a mesh representation wherein the color is applied to the mesh surface by UV mapping the mesh's surface to RGB images called texture maps that contain the color information for the mesh surface. "Truncated SDF" (TSDF) refers to a particular variation of the SDF representation that only stores the SDF where its contained distances are smaller than a predefined threshold. "Isosurface" refers to, in the context of SDF and TSDF, a 2-dimensional surface that is described by all points whose distance to the surface is 0, also called the "0-level set." "UV mapping" refers to a mapping between the coordinates of a 3D point on a mesh and a 2-dimensional coordinate on a planar surface. UV mapping may be used to display high-resolution color (texture) on 3D mesh surfaces. "VI-SLAM" refers to a visual-inertial simultaneous localization and mapping. VI-SLAM may be a particular type of SLAM algorithm that performs SLAM using both image and IMU data. "Voxel" refers to a portmanteau of "volume element." Voxels are cuboidal cells of 3D grids and are effectively the 3D extension of pixels. Voxels can store various types of information, including occupancy, distance to surfaces, colors, and labels, among others. "Wireframe" refers to a visualization of a mesh's vertices and edges, revealing the topology of the underlying representation. "Z-buffer" refers to, in rendering, an image which stores the distance to the closest surface observed by a specific camera. In modern rendering pipelines, Z-buffers are constructed by default. As such they do not add any additional computational cost to the rendering process.

Furthermore, as used herein, the term "metadata" refers to a set of data that describes and gives information about other data. Examples of the metadata are provided throughout the disclosure further for better understanding of the concept. The term "3D model" refers to a geometric model of a location in a digital form and may include texture or color information. The 3D model may be represented in the form of a 3D mesh, a 3D solid, a 3D boundary, a 3D point cloud, or other digital formats. The term "virtual representation" refers to an information-rich data representation of a location that takes the form of a 3D model, textured or otherwise, along with semantically labeled elements, spatially localized metadata, and/or application-specific data. In some embodiments, the virtual representation may comprise a building information model representation of a location to facilitate design, construction, insurance, and operation processes to form a reliable basis for decisions related to services and/or tasks to be performed at the location.

FIG. 1 illustrates a block diagram providing a high level overview of components and functions of system(s) and method(s), according to some embodiment. According to some embodiments, a virtual representation of a location is created. In an embodiment, the location refers to any open or closed spaces for which virtual representation may be generated. For example, the location may be a physical scene, a room, a warehouse, a classroom, an office space, an office room, a restaurant room, a coffee shop, etc. In an embodiment, operation 4001 involves capturing a scene to receive captured data 4000 (e.g., digital media such as RGB images, RGB-D images, RGB videos, RGB-D videos, and IMU data). At operation 4005, the captured data 4000 is used as input to construct a virtual representation VIR.

In some embodiments, the virtual representation VIR may be represented as a 3D model of the location with metadata MD1 comprising data associated images, videos, natural language, camera trajectory, and geometry, providing information about the contents and structures, as well as their costs, materials, and repair histories, among other application-specific details. The metadata MD1 may be spatially localized and referenced on the virtual representation VIR. In some embodiments, the 3D model may be in the form of a mesh at metric scale, or other units.

In some embodiments, a graphical user interface for interactively capturing the location through images and video with visual feedback may be provided to a user, for example. The feedback may include, but is not limited to, real-time information about a status of the 3D model being constructed, natural language instructions to a user, or audio or visual indicators of information being added to the virtual representation VIR. The graphical user interface also enables a user to pause and resume data capture within the location. Accordingly, the virtual representation VIR may be updated upon receiving additional data related to the location.

In some embodiments, a graphical user interface may be provided for displaying and interacting with a virtual representation of a physical scene and its associated information. The graphical user interface provides multiple capabilities for users to view, edit, augment, and otherwise modify the virtual representation VIR and its associated information. The graphical user interface enables additional information to be spatially associated within a context of the 3D model. This additional information may be in the form of semantic or instance annotations 4009; 3D shapes such as parametric primitives including, but not limited to, cuboids, spheres, cylinders and CAD models; and audio, visual, or natural language notes, annotations, and comments or replies thereto. The graphical user interface further enables a user to review previously captured scenes 4001, merge captured scenes, add new images and videos to a scene, and mark out a floor plan of a scene, among other capabilities.

The results of the present disclosure may be achieved by one or more machine learning models that cooperatively work with each other to generate a virtual representation. For example, in an embodiment, a first machine learning model may be configured to generate a 3D model, a second machine learning model may be trained to generate semantic segmentation or instance segmentation information or object detections from a given input image, a third machine learning model may be configured to estimate pose information associated with a given input image, and a fourth machine learning model may be configured to spatially localize metadata to an input image or an input 3D model (e.g., generated by the first machine learning model). In another embodiment, a first machine learning model may be configured to generate a 3D model, a second machine learning model may be trained to generate semantic segmentation or instance segmentation information or object detections from a given input 3D model or images, a third machine learning model may be configured to spatially localize metadata to an input 3D model or images. In an embodiment, two or more of the machine learning models may be combined into a single machine learning model by training the single machine learning model accordingly. In the present disclosure, a machine learning model may not be identified by specific reference numbers like "first," "second," "third," and so on, but the purpose of each machine learning model will be clear from the description and the context discussed herein. Accordingly, a person of ordinary skill in the art may modify or combine one or more machine learning models to achieve the effects discussed herein. Also, although some features may be achieved by a machine learning model, alternatively, an empirical model, an optimization routine, a mathematical equation (e.g., geometry-based), etc. may be used.

In an embodiment, a system or a method may be configured to generate a virtual representation VIR of a location with spatially localized information of elements within the location being embedded in the virtual representation VIR. In an embodiment, the system may include one or more hardware processors configured by machine-readable instructions to perform one or more operations of the methods discussed herein.

Figure 2:
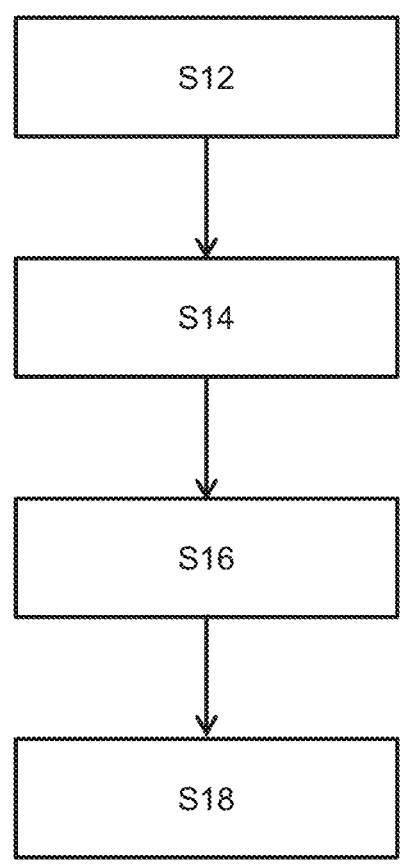
FIG. 2 is a flow chart of a method for generating a virtual representation of a location with spatially localized metadata, according to an embodiment.

FIG. 2 is a flow chart of a method for generating a virtual representation of a location, the virtual representation including a 3D model (of the location) with spatially localized metadata. In some embodiments, the virtual representation may be generated in real-time or offline at a later point after capturing data of a location (e.g., images of the location).

At operation S12, description data of a location is received. In an embodiment, the description data may be generated by a camera, a user interface, an environment sensor, an external location information database, or other sensors or devices discussed herein. In an embodiment, the description data includes, but is not limited to, a plurality of images of the location, intrinsics and pose matrices associated with the camera, or other data related to the location.

In an embodiment, the description data may include, but is not limited to, one or more media types, the media types comprising at least one or more of video data, image data, audio data, text data, user interface/display data, and/or sensor data. In an embodiment, description data may be received as sensor data from the one or more environment sensors, the one or more environment sensors comprising at least one of a GPS, an accelerometer, a gyroscope, a magnetometer, a barometer, or a microphone.

In an embodiment, the description data may be captured by a mobile computing device associated with a user and transmitted to the one or more processors with or without a first user and/or other user interaction. In an embodiment, the description data of the location includes receiving a real-time video stream of the location. The present disclosure provides additional description data and ways to receive the description data throughout the disclosure (e.g., see discussion with respect to FIGS. 4A and 4B).

At operation S14, metadata associated elements within the location, devices used to capture description data, or other metadata may be received. In an embodiment, the metadata may be automatically inferred using e.g., a 3D object detection algorithm, wherein a machine learning model is configured to output semantic segmentation or instance segmentation of objects in an input image, or other approaches. In an embodiment, a machine learning model may be trained to use a 3D model and metadata as inputs, and trained to spatially localize the metadata based on semantic or instance segmentation of the 3D model. In an embodiment, operations S14 and S16 may be combined to generate a 3D model with spatially localized metadata.

In an embodiment, spatially localizing the metadata may involve receiving additional images of the location and associating the additional images to the 3D model of the location; computing camera poses associated with the additional images with respect to the existing plurality of images and the 3D model using a geometric estimation or a machine learning model configured to estimate camera poses; and associating the metadata to the 3D model. In an embodiment, the additional images may be captured by a user via a camera in different orientations and settings.

As mentioned earlier, metadata refers to a set of data that describes and gives information about other data. For example, the metadata associated with an image may include items such as a GPS coordinates of the location where the image was taken, the date and time it was taken, camera type and image capture settings, the software used to edit the image, or other information related to the image, the location or the camera. In an embodiment, the metadata may include information about elements of the locations, such as information about a wall, a chair, a bed, a floor, a carpet, a window, or other elements that may be present in the captured images or video. For example, metadata of a wall may include dimensions, type, cost, material, repair history, old images of the wall, or other relevant information. In an embodiment, a user may specify audio, visual, geometric, or natural language metadata including, but not limited to, natural language labels, materials, costs, damages, installation data, work histories, priority levels, and application-specific details, among other pertinent information. The metadata may be sourced from a database or uploaded by the user. In an embodiment, the metadata may be spatially localized on the 3D model (e.g., generated by an operation S16 discussed later) or be associated with a virtual representation (e.g., generated by an operation S18 discussed later). For example, a user may attach high-resolution images of the scene and associated comments to a spatially localized annotation in the virtual representation in order to better indicate a feature of the location. In another example, a user can interactively indicate the sequence of corners and walls corresponding to the layout of the location to create a floor plan. In yet another example, the metadata may be a CAD model of an element or a location, and/or geometric information of the elements in the CAD model. Specific types of metadata can have unique, application-specific viewing interfaces through the graphical user interface.

At operation S16, a 3D model of the location and elements therein may be generated. In an embodiment, the 3D model is generated via a trained machine learning model using information from the description data as input. In an embodiment, the machine learning model may be configured to receive the plurality of images and pose matrices as inputs and to predict the geometric composition of the location as well as the elements therein to form the 3D model. In an embodiment, the 3D model may be generated using various methods as discussed with respect to FIG. 4A-4B later in the disclosure.

As an example, generating the 3D model includes encoding each image of the plurality of images with a machine learning model; adjusting, based on the encoded images of the plurality of images, an intrinsics matrix associated with the camera; using the intrinsics matrix and pose matrices to back-project the encoded images into a predefined voxel grid volume; provide the voxel grid with the features as input to the machine learning model to predicts the 3D model of the location for each voxel in the voxel grid; and extract a 2D surface of the predicted 3D model. In an embodiment, the intrinsics matrix represents physical attributes of a camera. For example, the physical attributes may include, but is not limited to, focal length, principal point, and skew. Other associated camera information may include non-linear distortion parameters (e.g., radial or tangential distortions of a lens) and other attributes. In an embodiment, the pose matrix represents a camera's relative or absolute orientation in a virtual world, the pose matrix comprising the 3-degrees-of-freedom rotation of the camera and the 3-degrees-of-freedom position in the virtual representation VIR.

At operation S18, a virtual representation VIR is generated based on the 3D model of the location. In an embodiment, generating the virtual representation VIR includes generating or updating the 3D model based on the real-time video stream of the location. In an embodiment, generating the virtual representation VIR includes annotating the 3D model with spatially localized metadata (e.g., received at the operation S14) associated with the elements within the location, and semantic information of the elements within the location. In an embodiment, the virtual representation VIR is editable by a user to allow for modifications to the spatially localized metadata. In an embodiment, the method may further include an operation for displaying metadata about an element when a user hovers over or selects the element within the virtual representation VIR of the location. Examples of a virtual representation having spatially localized metadata (e.g., of a floor and TV) are illustrated FIGS. 8G-8H and further discussed later in the disclosure.

As an example, the metadata associated with an element includes, but is not limited to, geometric properties of the element; material specifications of the element; a condition of the element; receipts related to the element; invoices related to the element; spatial measurements captured through the virtual representation VIR or physically at the location; details about insurance coverage; audio, visual, or natural language notes; or 3D shapes and objects including geometric primitives and CAD models.

In an embodiment, generating the virtual representation VIR involves spatially localizing the metadata within the 3D model. In an embodiment, the metadata may be spatially localized using a geometric estimation model, or manual entry of the metadata via a graphical user interface configured to allow a user to hover over or select a particular element, and add or edit the metadata. In an embodiment, the term "hover over" refers to pointing to a particular element e.g., by moving a pointer of the graphical user interface to a particular element, selecting refers to clicking a button of the mouse, tapping a touch screen of a device displaying the graphical user interface, an audio command, multiple finger touches on the screen for drawing shapes like lines, rectangle, free-form shape, or other ways of selecting an element on a user interface.

In an embodiment, generating the virtual representation VIR involves annotating elements (e.g., structures and other elements at the location) with dimensions, semantics in terms of e.g., walls, floors, objects, and annotating the metadata associated with the elements, and providing a user interface to take further actions based on the metadata related to the elements. In an embodiment, the annotating of the semantics and the metadata may be performed by a machine learning model or manually. For example, the machine learning model configured to generate the 3D model may be further configured to perform semantic and metadata annotation based on spatially localized information of the 3D model.

In an embodiment, generating the virtual representation VIR may include estimating, via a pose estimation method and the plurality of images, pose data based on the plurality of images and intrinsics of the camera; obtaining heuristic information associated with one or more standard elements detected within the location; and estimating, based on the heuristic information and geometric correlation between the plurality of images, a scale factor to determine the dimensions of the elements within the location. Additional methods of estimating pose information are discussed with respect to FIGS. 4A-4B.

In an embodiment, generating the virtual representation VIR with the semantic information involves identifying elements from one or more received images or the 3D model by another trained machine learning model configured to perform semantic or instance segmentation, and object detection and localization of each object in the input images or video. In an embodiment, the trained machine learning model may be configured to receive as input one or more RGB or RGB-D images associated with the virtual representation VIR. In another embodiment, the trained machine learning model may be configured to receive as input 3D data comprising, e.g.: a point cloud, mesh, voxel grid, TSDF.

In an embodiment, a device may not be configured to generate the virtual representation VIR due to memory or processing power limitations of a device. In this case, the operations of generating virtual representation VIR in real-time may be distributed on different servers or processors. For example, generating, in real-time, the virtual representation VIR includes receiving, at a user device, the description data of the location, transmitting the description data to a server configured to execute the machine learning model to generate the 3D model of the location, generating, at the server based on the machine learning model and the description data, the virtual representation VIR of the location, and transmitting the virtual representation VIR to the user device.

The present disclosure describes additional operations, methods, processes, algorithms used, etc., that may be used for generating the 3D model and the virtual representation, detailed below. Accordingly, in some embodiments, the method of FIG. 2 may be supplemented or updated based on such operations discussed herein.

Figure 3:
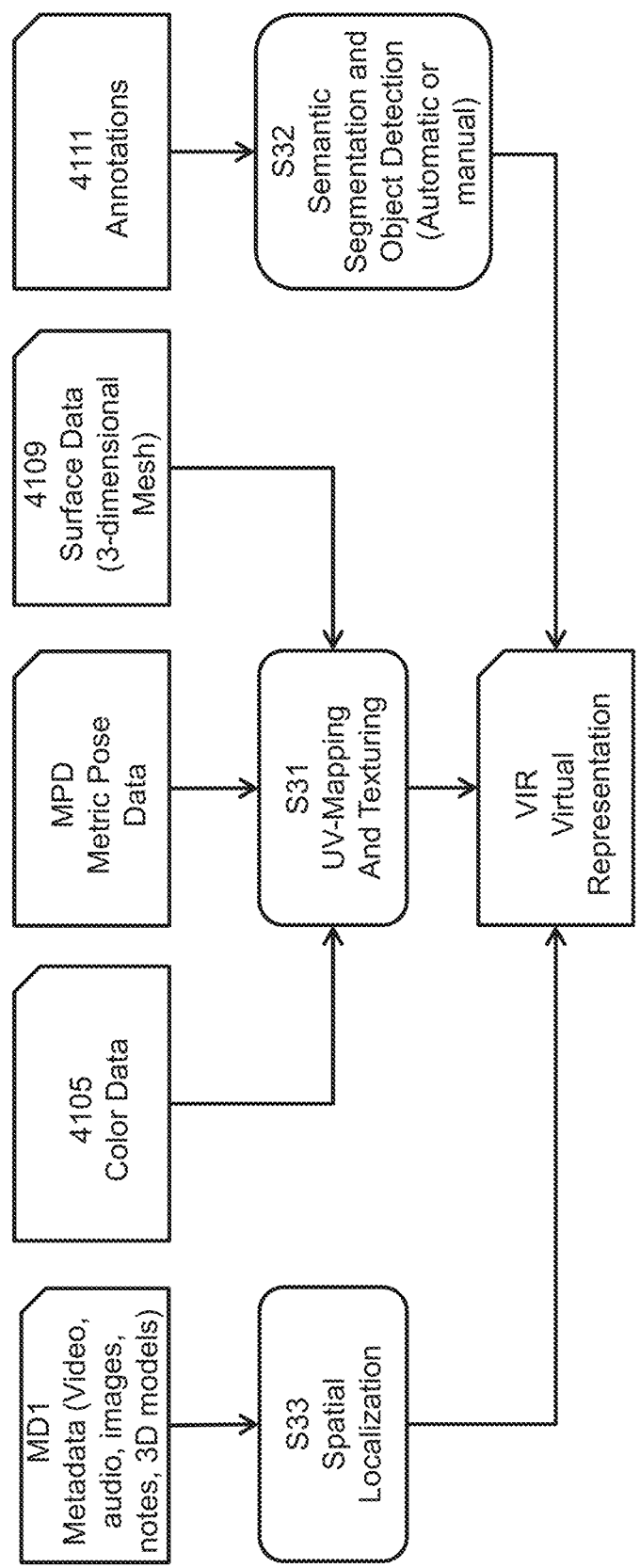
FIG. 3 illustrates an example way to construct a virtual representation using different types of input data, according to an embodiment.

FIG. 3 illustrates an example composition of the virtual representation VIR. In an embodiment, generating or constructing the virtual representation VIR involves an operation S31 for UV-mapping and texturing a 3D model with color information corresponding to the location using input data such as color data 4105, metric pose data MPD, and surface data 4109. An operation S32 involves adding semantic information and labels 4111. And an operation S33 involves spatially localizing additional metadata MD1. The operations S31, S32, and S33 are further discussed in detail throughout the present disclosure.

Figure 4A:
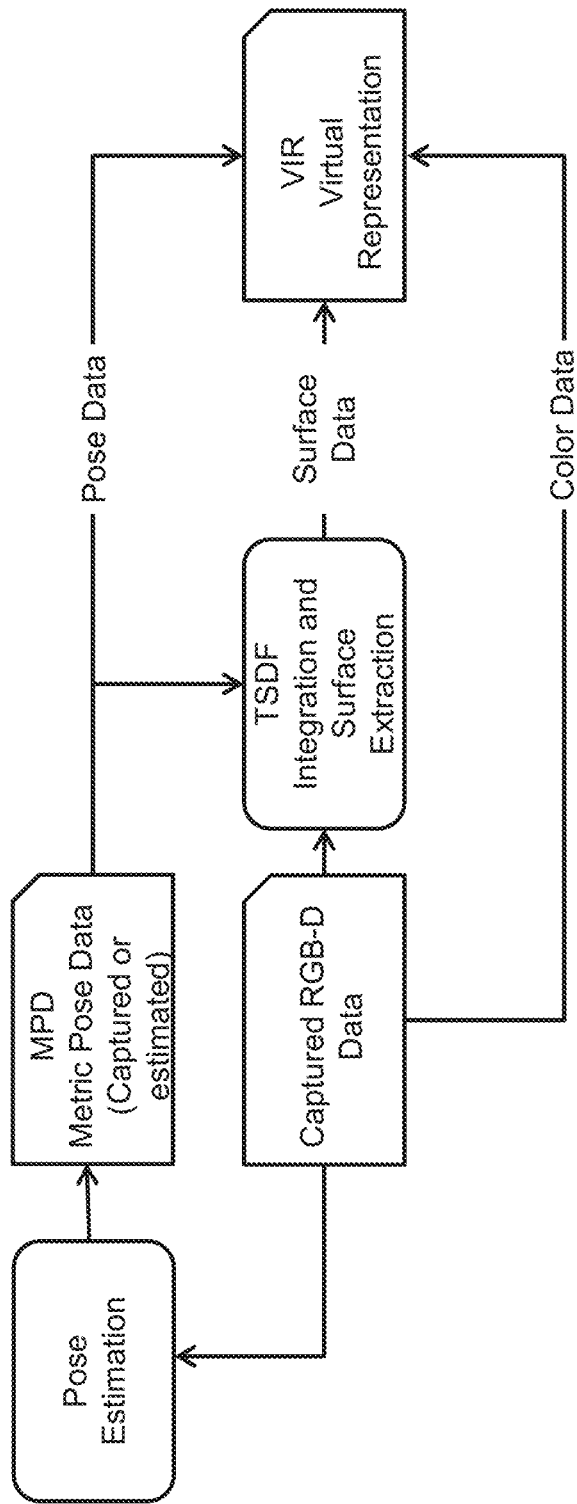
FIG. 4A illustrates an example way to construct a virtual representation using RGB data and depth data (e.g., RGB-D data) of a location, according to an embodiment.
Figure 4B:
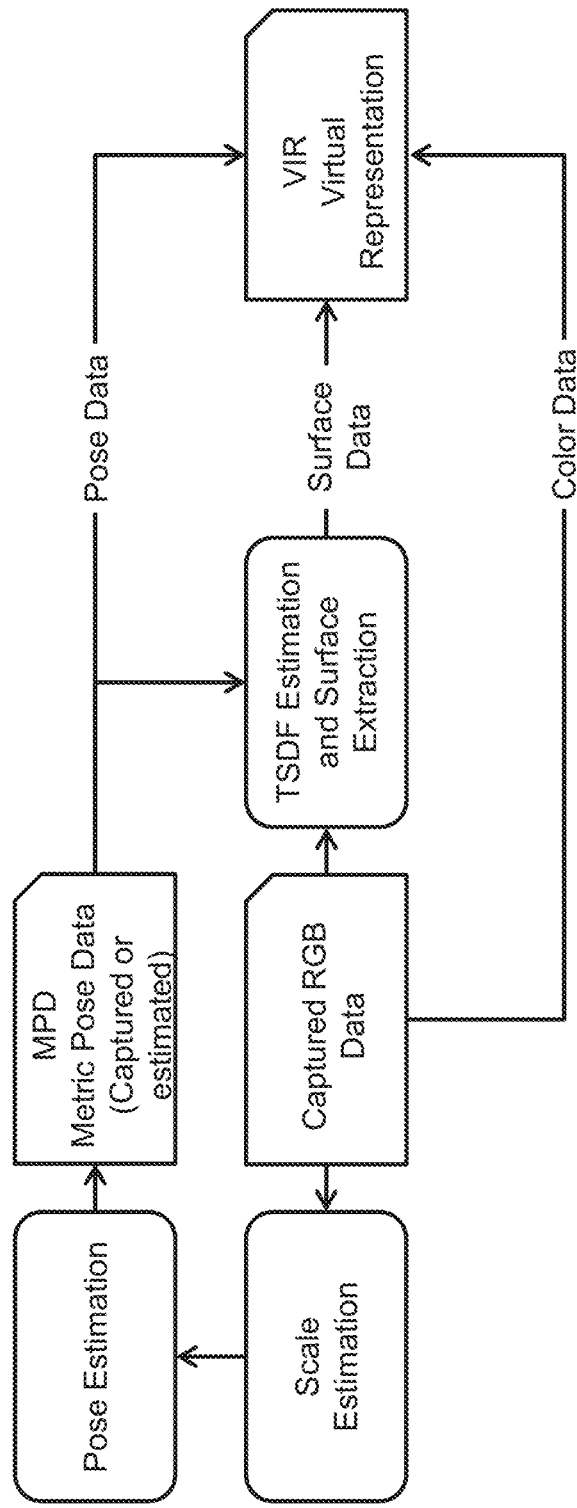
FIG. 4B illustrates an example way to construct a virtual representation using e.g., RGB data of a location, according to an embodiment.

FIGS. 4A and 4B are block diagrams of example methods for constructing a 3D model for generating a virtual representation using different input data and algorithms. According to an embodiment, the methods for constructing the 3D model may be applied to the operation S16 (in FIG. 2).

FIG. 4A is a block diagram representing constructing the virtual representation using depth (e.g., RGB-D data) and pose data. The pose data may be captured via a user's device or sensors, or estimated. FIG. 4B is a block diagram constructing the virtual representation using image data (e.g., RGB data) and an estimated scale factor associated with the image data. The methods of FIGS. 4A and 4B for generating the virtual representation VIR are further discussed in detail below. According to the present disclosure, the construction of the 3D model may be performed entirely on a capturing device with sufficient computational capabilities. Alternatively, a device-to-cloud streaming process can be used with sufficient connectivity between the capturing device and the cloud-based server. Alternatively, the construction of the 3D model may be performed offline once all RGB-D images have been acquired.

The example methods enumerated below may output a 3D model (e.g., in the form of a mesh or point cloud) with a set of associated posed RGB or RGB-D images. The methods to produce these outputs varies based on input modalities (which can also be part of the description data of the method in FIG. 2) made available by capturing devices. For example, the inputs such as a depth image, a posed image, and an RGB image may be captured as follows.

In an embodiment, a depth image (e.g., RGB-D image) may be captured as follows. An individual at a location may capture a collection of images or video of a scene with a device such as a camera and a depth sensor to obtain depth maps of the captured scene associated with color images or video frames. For example, the depth sensors may include, but are not limited to, time of flight sensors, structured light sensors, or LiDAR sensors. Such a group of devices may be referred to as RGB-D cameras, which capture RGB images or video frames as well as depth data (e.g. in metric scale). These depth sensors may be integrated in a single device or separate from the RGB camera. In an embodiment, the depth sensors may be calibrated to synchronize with the RGB camera. The RGB-D capture devices may or may not have associated camera pose information.

In an embodiment, posed image (e.g., metric posed RGB image) may be captured as follows. An individual at a location may capture a collection of images or video of a scene with a device such as a camera and an inertial measurement unit (IMU) sensor. These devices are capable of capturing RGB images or videos, as well as include an integrated 6 DOF or 9 DOF IMU. For example, the IMU sensor may include, but is not limited to, accelerometers, gyroscopes, and magnetometers that can be used to determine metric distance as the camera moves. These devices provide a metric camera position in a coordinate system scaled to correspond to the scene that enables visual-inertial simultaneous localization and mapping (VI-SLAM) or use of odometry algorithms.

In an embodiment, an image (e.g., RGB image) may be captured as follows. An individual at a location may capture a collection of images or video of a scene with one or more digital cameras configured to capture RGB or grayscale images or videos. These devices may include, but are not limited to, traditional video cameras, DSLR cameras, multi-camera rigs, and certain smartphone cameras. Some of these devices may provide relative camera pose information along with the RGB images using a built-in visual odometry or visual simultaneous localization and mapping (SLAM) algorithm. In an embodiment, any such device may be considered in a class of inputs as only providing camera information up to scale; that is, without a metric relationship to real world distances.

Referring to FIG. 4A, inputs such as RGB images and video, depth data (e.g., RGB-D), and pose data MPD, may be used to generate the virtual representation. In an embodiment, the pose data MPD may be captured or estimated. According to present disclosure, the combination and sub-combinations of disclosed features constitute separate embodiments.

Embodiment 1

In an embodiment, metric posed RGB-D images or video with pose information within a location (e.g., a physical scene of a room) may be used as inputs to construct the 3D model by integrating posed depth images into a persistent representation of distance-to-surface function. For example, the function can be represented as a signed distance function (SDF), which comprises a 3D grid that stores distances to the closest point on a surface within each grid cell. In another example, a truncated SDF (TSDF), which only stores distances less than a predefined threshold may be employed. Alternative representations for SDF exist, including spatial hashing data structures, general function approximations using multi-layer perceptrons, among others.

In the first embodiment, depth map integration may be performed by casting a ray from each pixel of the RGB-D image. The rays may be computed using intrinsic parameters of a range sensor and the provided pose. The signed distance to a surface along the ray may be stored as a distance-to-surface representation by the means of weighted running average.

Once an approximation of a distance to surface function is obtained, a surface in the form of a mesh can be extracted using an isosurface extraction algorithm, such as the marching cubes algorithm, resulting in the 3D model of the location. An example marching cubes algorithm is described in "Lorensen, William E., and Harvey E. Cline. *Marching cubes: A high resolution 3D surface construction algorithm*. ACM siggraph computer graphics 21.4 (1987): 163-169," which is incorporated herein by reference in its entirety.

The operations of the embodiment 1 may be performed entirely on a capturing device with sufficient computational capabilities. Alternatively, the images, video, and associated camera pose information may be streamed to a cloud-based server where the volumetric integration and isosurface extraction is performed. Subsequently the mesh or a rendering thereof can be streamed back to the device. This cloud-based streaming approach can be performed at interactive speeds with sufficient connectivity between the capturing device and the cloud-based server.

Furthermore, in an embodiment, a series of local or global optimizations, such as bundle adjustments and pose graph optimizations, can be performed to improve the camera pose information before fusing the information from each frame to construct the 3D model. This approach can also be done offline, once all RGB-D images have been acquired.

Embodiment 2

In an embodiment, unposed RGB-D images or video without pose information may be used as inputs. In this case, a relative pose estimation may be performed in a coordinate system that reflects a true metric scale of a scene. The estimation process may employ a variation of the iterative closest point (ICP) algorithm that incorporates camera geometry estimated from the associated RGB images using two-views and multi-view pose estimation algorithms. An example ICP algorithm is discussed in "Besl, Paul J.; N. D. McKay (1992). *A Method for Registration of* 3-*D Shapes*. IEEE Transactions on Pattern Analysis and Machine Intelligence. 14 (2): 239-256," which is incorporated herein by reference in its entirety. In an embodiment, IMU information from the capturing device may also be incorporated into this process as well.

Once poses have been estimated for each RGB-D image, a 3D model can be constructed using the methodology of the embodiment 1 (discussed above). This construction strategy can be performed in real time, operating in a streaming manner by estimating each pose as the associated RGB-D image is acquired, and subsequently fusing it with the information from prior frames to incrementally construct the 3D model of the location.

Embodiment 3

In an embodiment, posed images (e.g., metric posed RGB images) or video may be a collection of RGB images with metric pose information that can be used as inputs for determining 3D model of a location. The 3D model may be constructed using a combination of geometric and machine learning methods (e.g., a neural network training method). This methodology may be applied both in real time and as a subsequent offline procedure. In an embodiment, the real-time construction methodology includes four stages, discussed in detail below.

In an embodiment, the first stage involves encoding each captured image with a neural network. This network reduces the spatial resolution of an input image while encoding the image information with a high-dimensional feature representation. As the spatial resolution of the image is decreased, its intrinsics matrix needs to be adjusted accordingly.

In an embodiment, the second stage involves using the intrinsics and pose matrices for the encoded image to back-project the high-dimensional feature representation into a predefined voxel grid volume. Every high-dimensional feature is back-projected along a ray into the voxel grid, and every voxel intersected by each ray accumulates the features and stores the accumulation in memory.

The spatial extent of the voxel volume defines the scope of the 3D model. The voxel grid is specified in the same metric coordinate system as the camera poses, and its scale corresponds to the extent of the captured scene. The voxel grid may be specified by two parameters: a voxel grid resolution and a voxel size. The voxel grid resolution refers to the number of voxels along each of the three dimensions of the volume (e.g. 300 voxels×300 voxels×100 voxels). The voxel size refers to the metric dimensions of each cuboidal voxel comprising the voxel grid (e.g. 5 cm×5 cm×5 cm). The choice of the voxel resolution and the voxel size may be adjusted based on memory constraints of a hardware.

A scope or extent of the voxel grid can be static or dynamic. In the static case, the voxel grid may be associated with a specific region, and the high-dimensional image features are accumulated by all voxels intersected by the back-projected rays. In the dynamic case, only the subset of voxels intersected by the back-projected rays that also fall within a certain metric distance of the camera accumulate the high-dimensional image features. This reduces a computational memory usage, and thus can enable high voxel resolutions and small voxel sizes. For example, this reduces graphics processing unit's (GPU) memory usage by only loading a sub-grid, leaving the rest of the voxel grid on a central processing unit's (CPU) memory.

In an embodiment, the third stage involves providing the voxel grid with the accumulated features as input to a machine learning model (e.g., a neural network) configured to predict a truncated signed distance function (TSDF) for each voxel in the voxel grid. This model (e.g., the neural network) may also predict other desired outputs for each voxel, such as confidence in the prediction, semantic or instance information, and object localizations, among others. The operations of the third stage may also be performed in a static or dynamic mode, depending on device's memory constraints.

In an embodiment, the fourth stage involves recovering a 2D surface of the 3D model from the predicted TSDF. For example, the 2D surface may be predicted using an isosurface extraction algorithm, such as marching cubes.

In the present disclosure, each aforementioned stage may be performed asynchronously. For example, the first and second stages may be performed for a number of frames from a video input. After some preset number of frames have been accumulated in the voxel grid, the second stage, third stage, and the fourth stage may be performed to generate the 3D model constructed from the images captured up to that point in time. This asynchronicity may be used to enable real-time feedback during this form of 3D model construction.

In an embodiment, due the memory and processing requirements of the machine learning model (e.g., the neural network) used in stages herein, the 3D model construction may not be performed reliably on the capturing device. In this case, following operations may be performed to enable real-time construction. An individual frame of the video stream is selected or an individual image is captured. The selection process for this video stream may be fixed (e.g., every 10th frame), or dynamic through the use of a keyframe selection algorithm configured to select a most representative frame from the video stream within a particular time frame. The selected frame and its intrinsics and pose matrices may be uploaded to a cloud-based server for processing. Each received frame may be immediately processed on the cloud-based server through the first stage and the second stage using the provided camera information. At fixed intervals (e.g. every 3rd frame processed through the first and second stages), the third and the fourth stages may be performed.

Alternatively, the intervals for performing the third and the fourth stages may not be fixed, but can be dynamic based on changes to the features accumulated in the voxel grid. At this point, the method of the embodiment 3 will output a current state of the 3D model construction in the form of a mesh. The current mesh may comprise geometry, color, and other pertinent information such as quality, confidence, and probability indicators, or an image rendered thereof that may be transmitted back to the capturing device and displayed to the user. In the latter case, a visualization of a user's current location in the scene may also be rendered in the image to provide a visual reference of a user's relative orientation with respect to the 3D model being constructed.

In an embodiment, a series of local or global optimizations, such as bundle adjustments or pose graph optimizations, may be performed to improve the camera pose information before back-projecting the high-dimensional features into the voxel grid. Such optimization may be performed in real-time or offline.

In an embodiment, the 3D model construction method of the embodiment 3 may also be performed offline; that is, subsequent to all posed RGB images being captured.

As an example, the machine learning model (e.g., the neural network) used in the first and the third stages may be trained together using sets of posed RGB image inputs and ground truth (e.g., known TSDF output) corresponding to the 3D model. The training process may involve iteratively passing a subset of posed RGB images corresponding to a single scene to the network, encoding and back-projecting each image into the feature-accumulating voxel grid, predicting a TSDF representing the scene, computing an error between the prediction and the true TSDF of the scene, and propagating the computed error back to the network to update its parameters. In an embodiment, the inputs may be randomly modified during each training pass. For example, random image selection may be performed from the complete set of corresponding posed RGB images. Noise may be added to the camera information associated with each posed RGB image. Random visual modifications may be performed to the images themselves, including the color histograms and brightness levels, among other aspects.

Embodiment 4

Referring to FIG. 4B, inputs such as images or video without pose information may be used to generate the 3D model of a location for a virtual representation. For example, the input may be a collection of RGB images without metric pose information. Based on the inputs, a 3D model of the location may be constructed using a combination of geometric and machine learning methods (e.g., a neural network). In this embodiment, the 3D model construction methodology involves operations (i)-(iii), discussed below.

Operation (i) involves computing relative poses and intrinsics for each image, if the latter are also not provided, using a geometric reconstruction framework. For example, the geometric reconstruction may be performed by structure-from-motion (SFM), simultaneous localization and mapping (SLAM), or other similar approaches that triangulate 3D points and estimate both camera poses up to scale and camera intrinsics. The output of the operation (i) may be a set of camera intrinsics and poses for a plurality of the provided RGB images, as well as a 3D point cloud representing the captured scene. The images associated with the camera intrinsics and poses output by operation (i) may be referred to as a set of registered posed images.

Operation (ii) involves acquiring or estimating a scale factor that scales the camera poses and a 3D point cloud to reflect the metric scale of the captured scene. The estimation of the scale factor is as follows. In one example of scale factor estimation, a user may be prompted to provide an absolute scale reference. The prompt may come before a previous geometric estimation operation (e.g., at the operation (i)), in which case the user may be requested to place a template pattern at some specified distance apart in the scene for which a 3D model is being constructed. The specified distance may be used as a reference to scale the outputs of the geometric reconstruction step.

In another example of scale factor estimation, a user may be provided with one of the registered images, displayed with two 2-dimensional points imposed on the image. The user may then be requested to measure a distance between those points in the physical scene. To ensure that the 2-dimensional points displayed to the user correspond to reasonable and accessible regions of the physical scene, heuristics may be used. The heuristics may be guided by estimated camera poses and semantic information estimated using an instance or semantic segmentation algorithm.

In yet another example of scale factor estimation, semantic information may be estimated using an instance or semantic segmentation algorithm to make heuristic size assumptions about a size of known features, such as doors, windows, wall outlets, among others. Based on correspondence determined during the operation (i) between the semantically-labeled pixels of a registered image and 3D points in the 3D point cloud, a scale factor may be estimated. The scale factor may then be applied to the camera poses and the 3D point cloud.

At operation (iii), given the scaled camera poses corresponding to a metric scale of the physical scene, the operations of the embodiment 3 may be performed to reconstruct the 3D model using a mix of geometric and machine learning methods.

An alternative to the embodiment 3 is to estimate dense metric depth maps for each registered image and subsequently use the method of the embodiment 1. To do this, a collection of inference and geometric estimation algorithms may be configured to determine per-pixel information comprising semantic or instance labels, depth or disparity, surface normals, and planar surface identification. As an example, a neural network may be trained to perform a semantic or instance segmentation on each registered image. Such a trained neural network provides a semantic or instance label for each pixel in each registered image. In an example, a multi-view stereo (MVS) algorithm may be configured to produce dense, geometrically-estimated depth and surface normal maps per image. In another example, a neural network of the class of depth estimation algorithms may be configured to infer a relative depth or disparity for each pixel in each registered image. This neural network may take as input RGB images alone or RGB images along with one or more sparse or dense depth maps from prior estimation or inference steps. The same or another neural network may infer a surface normal estimate for each pixel in each registered image. This network may also take as input RGB images alone or RGB images along with one or more sparse or dense depth maps from prior estimation or inference steps.

Further geometric estimations may be performed to estimate planar surfaces using information from the output obtained by operation (i), discussed above. For example, the planar surfaces may be estimated using lines identified in the registered images, estimated homographies (e.g., transformations of a Euclidean space that preserve the alignment of points), and planes fit to triangulated 3D points. Planar surfaces may also be inferred using a machine learning model (e.g., a neural network) configured for the task of plane segmentation. The preceding estimations and inferences may be performed either sequentially or in parallel, and the outputs may be fused per-image using an optimization scheme that generates globally geometrically-consistent metric dense depth maps for all registered images. Once these metric dense depth maps are obtained, the method of the embodiment 1 may be used to fuse the information into a single 3D model.

Operations of the aforementioned approaches may also be used to supplement the embodiment 1 and the embodiment 3. For example, in some cases, due to noise and errors in the capturing processes of the embodiment 1 and the embodiment 3, some regions of the resulting 3D model may not accurately represent the physical scene. The depth predictions, surface normal estimates, semantic labels, and plane segmentations for each posed RGB image may be incorporated into an optimization of the mesh output provided by the embodiment 1 and the embodiment 3. This information may be spatially localized on the 3D model via back-projection using the camera information associated with each posed RGB image. Subsequently, the 3D model may be updated by minimizing a cost function to achieve global consistency. For example, the cost function can be a function of difference between the predicted values from all views and the 3D model output by the embodiment 1 or the embodiment 3.

Alternative approaches further include layout estimation algorithms that leverage lines, planes, vanishing points, and other geometric indicators, possibly with the inclusion of one or more neural networks to estimate a layout of the location (e.g., a room or a building). In an example, the layout estimation algorithm may incorporate constraints and heuristics such as orthogonal junctions, planar assumptions about a composition of an indoor scene, and cuboidal layout assumptions to estimate the layout of the location.

In an embodiment, a 3D model constructed above may be textured or colored. Given the 3D model of a location (e.g., represented as a 3D mesh) along with associated posed RGB images, color information from the posed RGB images may be used to compute color information for the 3D model to accurately represent the location. The color information may be applied to the 3D mesh using a per-vertex coloring, a per-face coloring, or UV texture mapping (illustrated in FIG. 5).

In the per-vertex coloring approach, color may be assigned to each vertex in the 3D mesh. This approach involves identifying camera views of the 3D model in which a vertex is visible by rendering the 3D mesh into virtual cameras characterized by the pose and intrinsics information from the associated posed RGB images. Then, check whether a vertex is visible to a virtual camera via a depth buffer (e.g., Z-buffer) during the rendering process. Such a depth buffer also determines subpixel locations on each associated image to which a 3D vertex corresponds. Based on the set of camera views through which each vertex can be seen and the set of subpixel locations to which the vertex corresponds, a color can be assigned to the vertex. For example, colors may be assigned based on a weighted median of the RGB colors at each corresponding subpixel location on the associated posed images. Alternative ways to determine the color include simple averaging and view-dependent weighted averaging.

In another variation, when the posed images contain a depth channel and the 3D mesh is created via a RGB-D integration method, each vertex can be directly assigned a color during the integration step, omitting the need for the Z-buffering described above.

Per-vertex colors may be further optimized in conjunction with the 3D mesh geometry using iterative optimizations to maximize a photometric consistency of the vertices and the geometric fidelity of the poses of the associated RGB images.

Once each vertex in the 3D mesh has an associated RGB color, faces of the 3D mesh may be colored using an interpolation of adjacent vertices. This is implemented by known commodity graphics cards and rendering libraries.

Figure 5:
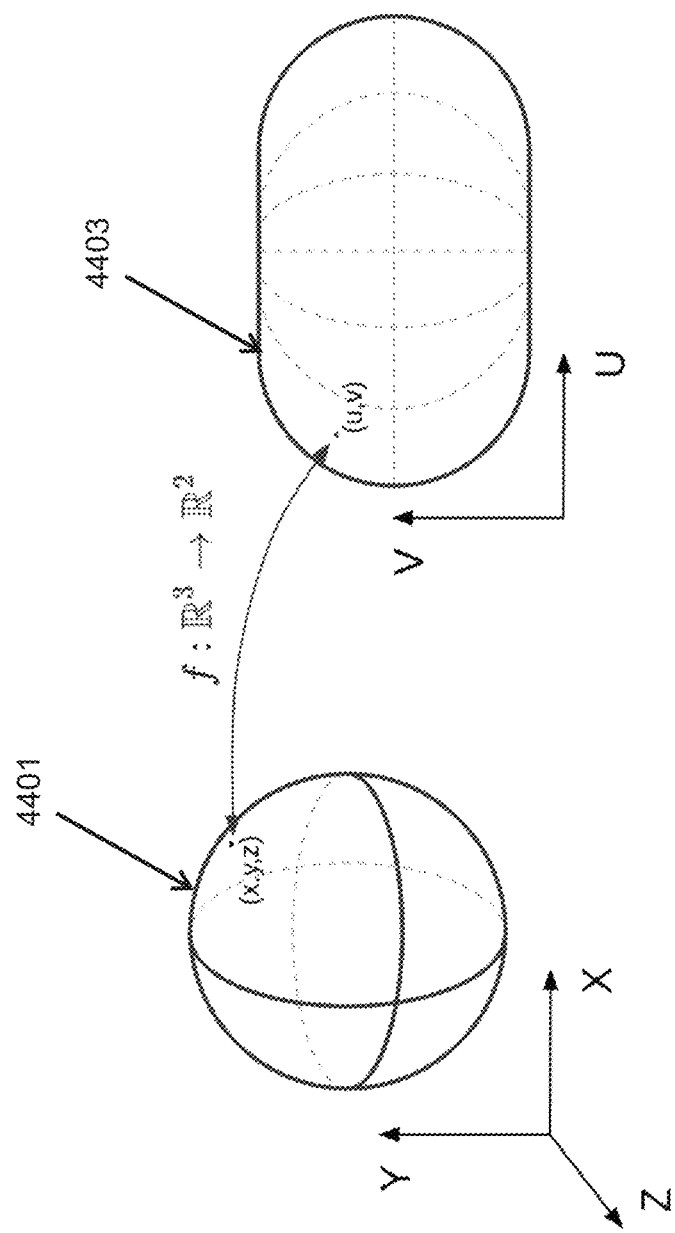
FIG. 5 illustrates UV mapping process to add texture or color to a virtual representation, according to an embodiment.

Referring to FIG. 5, in the UV texture mapping, colors may be assigned to the 3D mesh through UV-mapping. This approach enables a high level of detail to be portrayed on the 3D model. In FIG. 5, a space 4401 is a 3D space characterized by Cartesian coordinates [x, y, z], and a space 4403 is a UV representation of the 3D space characterized by a mapping function $f$. The UV texture mapping process may involve a first preprocessing operation to reduce a number of vertices and faces in the 3D mesh using a mesh simplification algorithm including, but not limited to, quadric edge collapse. Further, the 3D mesh is decomposed into a set charts that are each homeomorphic to a topological disc using an algorithm including, but not limited to, superfaces, progressive meshes, and least squares conformal maps. Each chart is parameterized using a conformal mapping and then packed tightly into one or more image grids called texture atlases. A mapping (e.g., function $f: R^3 \rightarrow R^2$) between each vertex's 3D position on the 3D mesh and its 2-dimensional coordinates on a texture atlas is stored.

Examples of the algorithms discussed in the UV-mapping process are discussed in following references, all of which are incorporated herein by reference in its entirety. A surface simplification algorithm is described in "Garland, Michael, and Paul S. Heckbert. *Surface simplification using quadric error metrics*. Proceedings of the 24th annual conference on Computer graphics and interactive techniques. 1997." A superfaces algorithm is described in "Kalvin, Alan D., and Russell H. Taylor. *Superfaces: Polygonal mesh simplification with bounded error*. IEEE Computer Graphics and Applications 16.3 (1996): 64-77." A progressive meshes algorithm is described in "Hoppe, Hugues. *Progressive meshes*. Proceedings of the 23rd annual conference on Computer graphics and interactive techniques. 1996." A least squares conformal maps algorithm is described in "Levy, Bruno, et al. *Least squares conformal maps for automatic texture atlas generation*. ACM transactions on graphics (TOG) 21.3 (2002): 362-371."

Colors may be assigned to the texture atlas by following this mapping from each texel to its corresponding 3D coordinate on the mesh surface to the subpixel locations on the posed images to which this 3D coordinate on the mesh surface is visible. The texel is assigned a color based on a weighted median or averaging, analogous to how the vertices of the mesh are colored, as discussed above. This procedure fills the texture atlases with the relevant colors from the associated RGB images thereby enabling a highly realistic coloring of the mesh. The mesh, the texture atlases, and the UV-mapping may be provided to a graphics card, which handles the real-time display of the textured models.

In a per-face coloring approach, faces themselves can be assigned an RGB color using a method similar to how vertex colors are assigned above. This approach may result in a lower-resolution rendering of the location's color information.

Figure 6C:
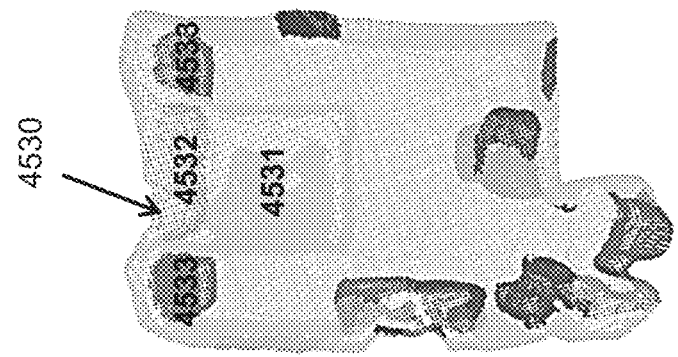
FIG. 6C is a top-down rendering of a semantically annotated 3D model corresponding to the scene depicted in part by the image of FIG. 6A, according to an embodiment.
Figure 6B:
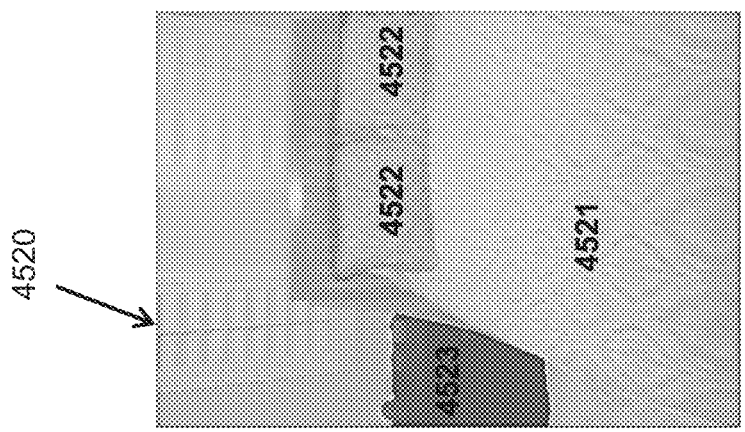
FIG. 6B is an example of the image of the scene (in FIG. 6A) with automatically generated semantic annotations overlayed, according to an embodiment.
Figure 6A:
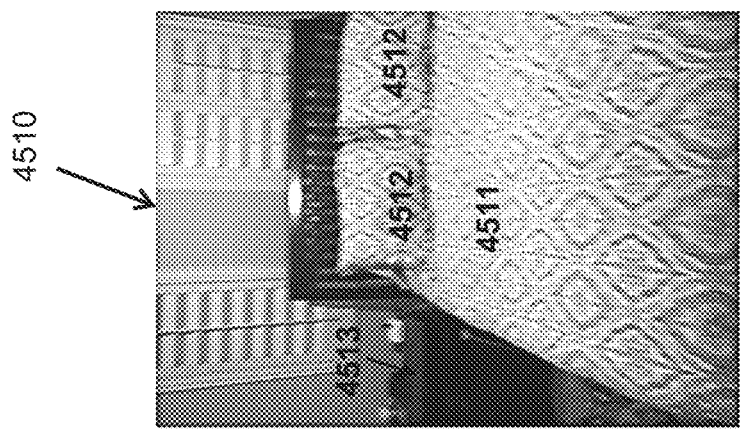
FIG. 6A is an example image of a scene for which a virtual representation is to be generated, according to an embodiment.

FIGS. 6A-6C pictorially depict adding and visualizing semantic information and labels for generating a virtual representation of a scene at a location. According to the present disclosure, semantic information may be added to a 3D model or images of a location automatically or manually. For example, the semantic information may be added automatically e.g., via a trained machine learning model configured to do semantic or instance segmentation to generate the virtual representation using either the set of posed RGB or RGB-D images or the 3D model. FIG. 6A shows an image 4510 of a scene including elements such as a bed 4511, two pillows 4512, and a side table 4513. FIG. 6B illustrates a 3D virtual representation 4520 of the image 4510, where an element 4521 corresponds to the bed 4511, elements 4522 correspond to the pillows 4512, and an element 4523 corresponds to the side table 4513. FIG. 6C illustrates a top-down view 4530 of the virtual representation 4520. In the top-down view 4530 an element 4531 corresponds to the bed 4511, an element 4532 corresponds to the pillows 4512, and elements 4533 correspond to the side table 4513. In some embodiments, the semantic annotation may be image-based or 3D-model based, as discussed in detail below.

In an image-based semantic segmentation, given a set of registered images (e.g., RGB or RGB-D images), semantic labels may be inferred by one or more machine learning models (e.g., a neural network) trained for semantic or instance segmentation in order to output a semantic or an instance label for each pixel in each image. In an embodiment, a user may use a graphical user interface to manually specify per-pixel semantic or instance labels by selecting pixels individually or in groups and assigning a desired label. Additionally, another model (e.g., another neural network) may be trained for object detection and later used to localize and label bounding boxes for elements in the registered images. This 2-dimensional object localization and annotation may also be performed by a user manually through the graphical user interface.

The annotated posed RGB or RGB-D images may be further spatially localized in the context of the 3D model based on the camera poses and intrinsics associated with each posed image. Using this information, the annotations may be back-projected to the 3D model. In the case of per-pixel or regional segmentation annotations, labels (e.g. bed, pillow, table, wall, window, floor, etc.) may be represented on surfaces of the 3D model through colors, highlighted regions, and other visual indicators. The spatial extent of the labels (e.g. bed, pillow, table, wall, window, floor, etc.) may be determined by examining a region of the 3D model contained by a hull that surrounds all back-projected labels of a certain type. Weighted aggregation and voting schemes may be used to disambiguate regions that may appear to share different labels due to effects of noise and errors in the construction of the 3D model, or the inferred or manually annotated labels. For a 2-dimensional bounding box annotations on registered images, associated depth information for each image along with multiple bounding box annotations of a given object may be used to provide a 3D cuboid bounding box around the object within the 3D model.

In a 3D-model based semantic segmentation, given a 3D model, semantic labels can be inferred by one or more machine learning models (e.g., a neural network) trained for 3D semantic or instance segmentation and 3D object detection and localization. The 3D model may be provided as input to these trained machine learning models (e.g., neural networks) in the form of a 3D mesh, a point cloud, a voxel grid, an implicit function, or an encoded representation. Other inputs such as posed RGB or RGB-D images, image annotations (e.g. images with semantic labels, instance labels, or bounding boxes and labels), and camera pose and intrinsics information, among others may also be provided to these trained machine learning models (e.g., neural networks). These trained machine learning models may be configured to output semantic annotations directly on elements of the 3D model, such as vertices or faces of a mesh, texture atlases that are UV-mapped to the mesh, points in a point cloud, or voxels in a voxel grid. Additionally, these trained machine learning models may provide the 3D cuboid bounding box around objects in the 3D model, along with associated semantic or instance labels.

In an embodiment, a user may also provide semantic, instance, and bounding box annotations directly on the 3D model (e.g., in the form of a mesh) through a graphical user interface. The user may directly apply natural language semantic and instance labels to mesh elements such as vertices or faces, or may label texture atlases that are UV-mapped to the mesh. Additionally, the user may draw 3D polyhedra around objects in the 3D model and associate a natural language label with them.

Furthermore, as discussed herein, a virtual representation includes spatially localized metadata. In an embodiment, information may be added to the virtual representation as deemed pertinent by an application (e.g., moving, cost estimation, risk assessment, damage estimation, etc.) and spatially localized in the context of the location. Depending on the type of data being added, the spatial localization may be automatic or manually specified through a graphical user interface.

In an example, a process of automatic spatial localization involves several steps. Additional images (e.g., captured by a reoriented camera) may be registered. Registering additional images such as RGB or RGB-D images of the location to the constructed 3D model may be performed by a camera relocalization process. The camera relocalization process involves computing relative camera poses associated with the additional images with respect to the existing set of registered RGB or RGB-D images and the 3D model. In an embodiment, the relocalization may be performed by a geometric estimation or via one or more trained machine learning models. The new RGB or RGB-D images may have associated annotations, such as polygonal annotations of regions of interest in the image, which can be spatially localized on the 3D model. The images themselves are also spatially localized in the context of the 3D model, so that if a user specifies a region of interest through a graphical user interface, the user could view the images associated with that region of the 3D model. Similarly, a camera position and orientation within the context of the 3D model is also available from this process, allowing a user to specify a specific image to view based on its spatial location in the virtual representation.

In another example, a manual spatial localization involves manually adding additional information to the virtual representation of the location and spatially localizing the added information within the context of the 3D model through a graphical user interface. Through the graphical user interface, a user can manually select a region of the 3D model, a region on a spatially localized RGB or RGB-D image, or an entire image and then add additional domain-specific information. For example, the user may associate receipts; invoices; material specifications; spatial measurements captured through the virtual representation or at the location; details about insurance coverage; audio, visual, or natural language notes; 3D shapes and objects comprising geometric primitives and CAD models, among others; and other information with these selected regions or images.

Figure 10:
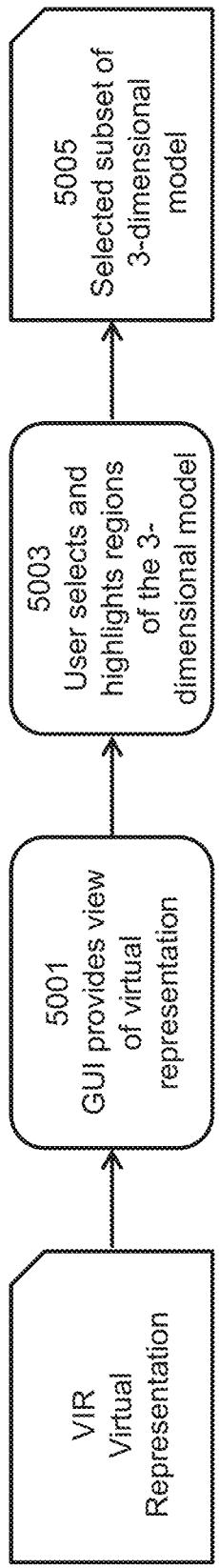
FIG. 10 is a block diagram of selecting regions of a 3D model, according to an embodiment.

FIGS. 10, 11A-11C, and 14A-14B illustrate an example graphical user interface for selecting regions of a 3D model, deleting a region of a 3D model, or selecting semantic regions within a 3D model of a location (e.g., a portion of a room). Referring to FIG. 10, at operation 5001, a graphical user interface provides a view of a virtual representation VIR including the 3D model of the location. At operation 5003, a user may select or highlight regions of a 3D model to generate a subset of 3D model 5005.

Figure 11A:
FIG. 11A-11C illustrate an example view of a 3D model, a selected portion of the model, and deletion of the selected portion, respectively, according to an embodiment.
Figure 11B:
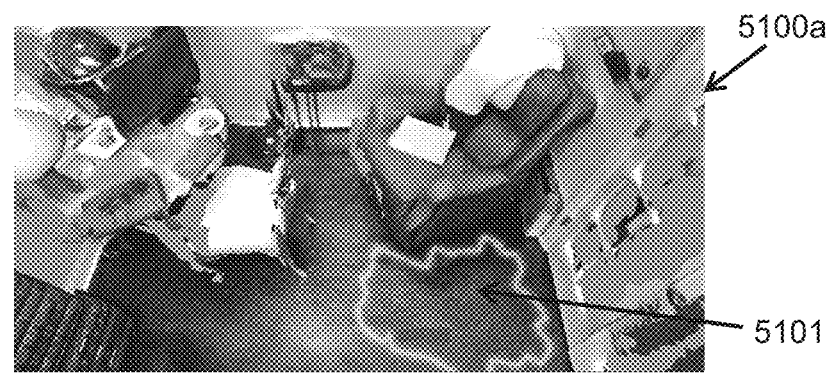
Figure 11C:
Figure 14A:
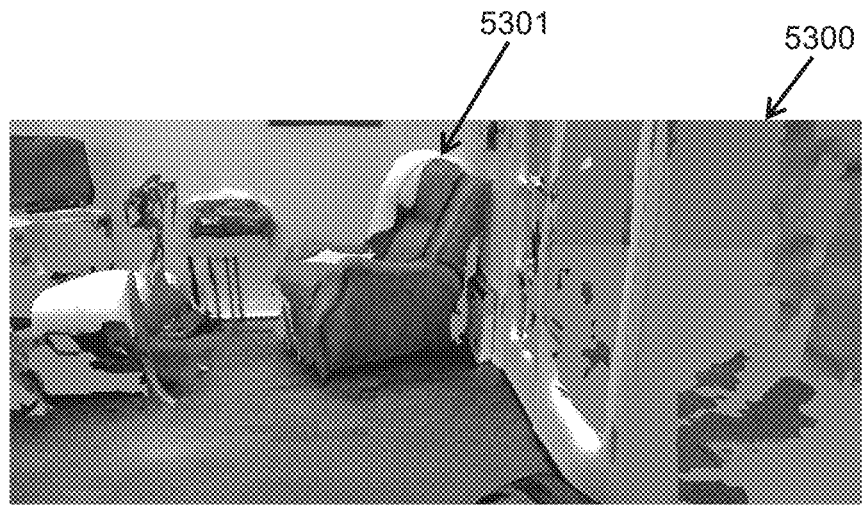
FIG. 14A is a 3D model configured with semantic segmentation of elements in a portion of a room such as a chair, according to an embodiment.
Figure 14B:
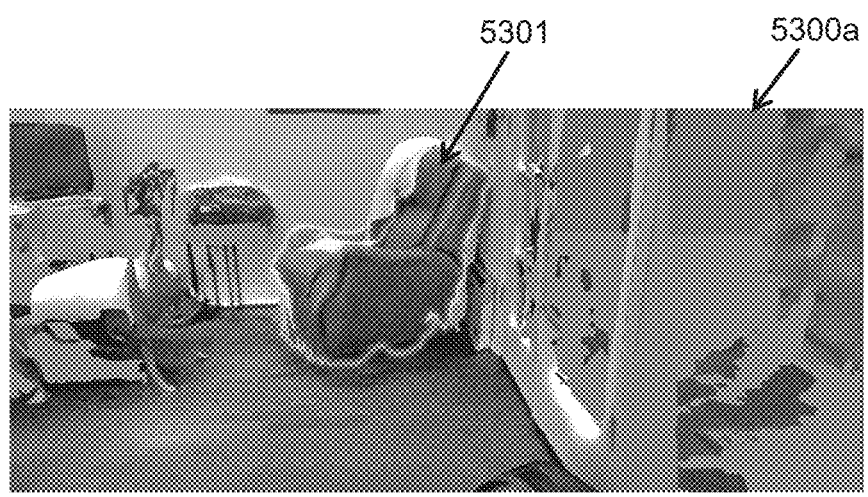
FIG. 14B illustrates selecting a semantic element (e.g., the chair) in the 3D model of FIG. 14A, according to an embodiment.
Figure 15A:
FIGS. 15A and 15B illustrate a 3D model of a room and a wireframe representation of the 3D model, according to an embodiment.
Figure 15B:

FIGS. 11A-11C, 14A-14B, and 15A-15B illustrate a graphical user interface (GUI) for viewing and interacting with a virtual representation having a 3D model of elements within a room. In FIGS. 11A-11C, a first portion 5100 of a virtual representation of a room is shown. In FIGS. 14A-14B, a second portion 5300 of the virtual representation of the same room is shown. In FIGS. 15A-15B, a third portion 5400 of the virtual representation of the same room is shown.

As shown in FIG. 11B, a user may select a region 5101 of the first portion 5100 of the virtual representation of the room. The selected region 5101 may be defined by a free shaped boundary or a boundary with particular shape (e.g., square, rectangle, etc.) within the virtual representation 5100a. Further, the selected region 5103 may be deleted or otherwise hidden from view to generate a modified virtual representation 5100c.

As shown in FIG. 14A, the second portion 5300 of the virtual representation of the room includes elements such as a chair 5301, which may be semantically segmented by a machine learning model as discussed herein. As such, when a user selects a portion of the chair 5301, the entire chair 5301 may be highlighted or selected as shown by an outline around the chair 5301 in the virtual representation 5300a, in FIG. 14B. FIGS. 15A and 15B illustrate the third portion 5400 of the virtual representation of the room, and a corresponding wireframe representation 5410 of the 3D model of the virtual representation.

Figure 7:
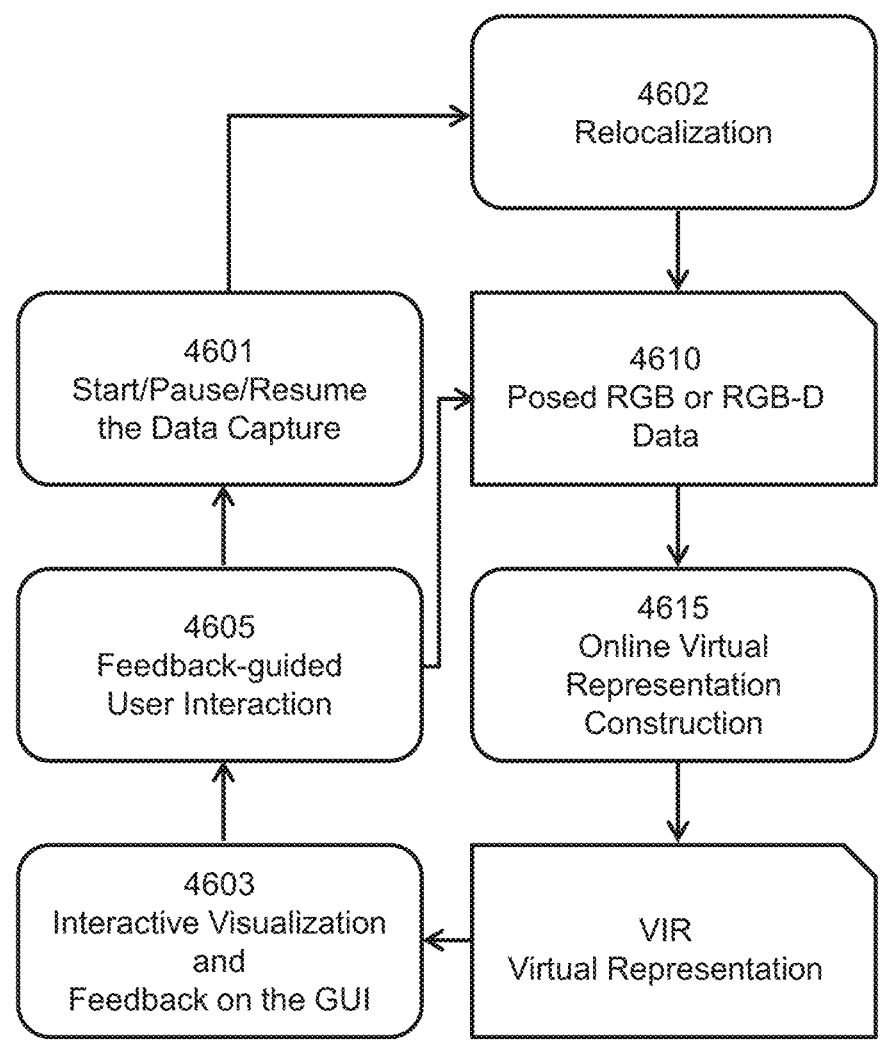
FIG. 7 is a block diagram showing a process of generating or updating a virtual representation based on feedback information, according to an embodiment.

Referring to FIG. 7, a virtual representation may be generated or updated according to feedback information related to a location or the virtual representation being constructed. In an embodiment, the feedback information may be provided to a user via another graphical user interface, different from the one used to display the virtual representation. For example, a first graphical user interface may be used for displaying the virtual representation VIR and a second graphical user interface may be provided for interactively capturing the location through images and video with visual feedback.

FIG. 7 is an exemplary flow chart of a method for updating the virtual representation VIR using the feedback information. In an embodiment, the method, at operation 4603, generates feedback information that guides the user to collect additional description data (e.g., measurements, images, etc.) at a particular portion of the location. Based on the additional description data collected in response to the feedback information, the virtual representation VIR may be updated. Such updating improves the reliability of the virtual representation VIR. For example, the additional data may improve the accuracy and the confidence related to elements presented in the virtual representation. In an embodiment, the feedback information may be generated in real-time, and the additional data collected may be used to update the virtual representation VIR in real-time. In an embodiment, the feedback information may be in real-time, but the updating of the virtual representation VIR may be offline, i.e., after collecting all the additional information.

In an embodiment, generating the feedback information may include generating visual indicators for guiding a user to collect additional information for improving the virtual representation VIR. In an embodiment, the visual indicators may be a probability map, a color coding, or other visual indicators that serve as a guide for a user to collect the additional information. In an embodiment, the visual indicator represents confidence levels associated with the elements within the location, where the visual indicators having a low confidence level (e.g., below a confidence threshold) indicates the user to collect additional description data at that particular portion of the location.

In an embodiment, generating the visual indicators includes generating, via a machine learning model, a probability map indicating how accurately a particular element is represented in the virtual representation VIR or a 2D representation of the virtual representation VIR. In the probability map, a low probability portion indicates the corresponding portion of the virtual representation VIR may need additional data to further improve the virtual representation VIR. In an embodiment, a number of instances of each element in the plurality of images may be determined and constraints (e.g., geometric, relative position with other elements, pose information, etc.) associated with each element may be evaluated to determine how accurately a particular element is represented in the virtual representation VIR. It can be understood that the probability map is used as an example of generating the visual indicators and does not limit the scope of the present disclosure. A person of ordinary skill in the art may employ other schemes to determine the visual indicators.

At operation 4605, based on the feedback information, the user may interact with the scene of the location using the second graphical user interface and the user's device to collect additional information such as additional posed RGB or RGB-D data 4610. For example, the additional information may be captured according to an operation 4601, which involves starting, pausing, and/or resuming the data capturing.

In an example, at the operation 4601, a user may pause and resume during the capture process and add more RGB or RGB-D images to the 3D model after an initial 3D model is constructed. In another example, when a user is capturing RGB-D images and video or metric posed RGB images and video, the second graphical user interface enables the user to pause and subsequently resume capturing the visual media. During the pause, the user may inspect and review the 3D model in its current state on the first graphical user interface. At the start of the resumption stage, indications may be displayed on the first graphical user interface instructing the user to return to a particular portion of the scene that was previously captured and move the device around to re-capture portions of the scene that have previously been captured.

At operation 4602, the additional images may be relocalized. In an embodiment, the relocalization process involves computing relative camera poses associated with the additional images with respect to an existing set of posed RGB or RGB-D images and the 3D model. In an embodiment, overlapping portions between the additional images and previously captured images may be analyzed to relocalize the user's position within the scene and enable the user to continue capturing RGB-D or metric posed RGB images to further construct the 3D model. After completion of the relocalization, the user may be notified via audio and visual indicators through the second graphical user interface.

At operation 4615, the virtual representation VIR may be constructed or updated based on the additional description data 4610. For example, the updating involves inputting the additional data to the machine learning model to update the corresponding portion of the virtual representation VIR (e.g., as discussed at operation S18 of FIG. 2).

In an embodiment, the construction and updating of the 3D model may be an interactive process. After capturing data and constructing an initial 3D model, the user may subsequently add additional RGB or RGB-D images and video to the virtual representation through the first graphical user interface. In an embodiment, these additional images and video may be relocalized and further added to the virtual representation. When the 3D model is displayed for inspection and review, the first graphical user interface may indicate regions of the 3D model that may be incomplete or of low quality, and provide directives to the user to guide them in capturing further images and video that may improve the completeness and quality of the 3D model.

Once a capture has been completed, the user may view an updated 3D model that is constructed on the first graphical user interface. The first graphical user interface enables the user to inspect the 3D model for completeness and fidelity to the corresponding scene. The first graphical user interface also enables the user to choose to further refine the 3D model by applying algorithms that may improve the camera pose estimation and color texturing, as well as other aspects of the 3D model, in order to better inspect the quality of the 3D model.

In an embodiment, steps in the method of FIG. 7 may vary based on capabilities of the capture device of the user. For example, in the capture process (e.g., at the operation 4601) there are multiple parameters that can be adjusted. In an embodiment, the second graphical user interface may include options for the user to select a set of preset parameters depending on the location of the scene, such as an indoor or outdoor setting.

In an embodiment, the first graphical user interface may be used during the capture process to collect the data for constructing, in real-time or offline, the 3D model component of the virtual representation. During the real-time data capture, the capturing process may be paused and resumed, for example. In both cases, additional data may be captured and added to the 3D model subsequent to its initial construction. After the capture, the user may interact with a view of the virtual representation VIR and inspect the constructed 3D model in order to ensure its fidelity to the scene.

FIGS. 8A-8E illustrate an incremental progress of construction of a 3D model using a video stream of a room. In the present example, a side-by-side visualization of captured data of portions of the room, and a corresponding construction of the 3D model is shown. Although FIGS. 8A-8E show a particular frame selected from the video stream shown for illustration purposes, the video stream and real-time construction of the 3D model is a continuous process and both the video stream and corresponding update of the 3D model can be seen simultaneously. A final construction of the virtual representation using the constructed 3D model along with exemplary metadata is illustrated in FIGS. 8F-8H.

Figure 8A:
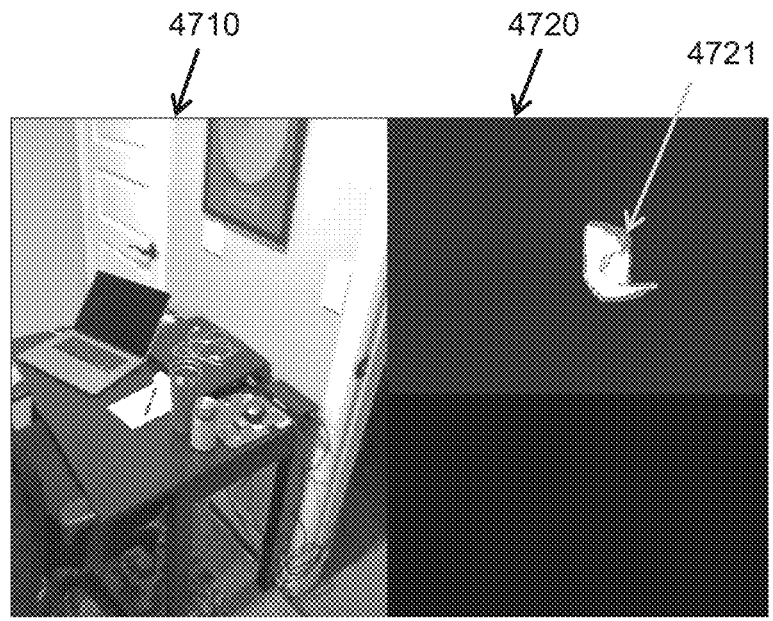
FIGS. 8A-8E illustrate an example construction (e.g., in real-time) of a virtual representation based on images of different portions of a room, according to an embodiment.

FIG. 8A shows the first frame 4710 of the video stream associated with a first portion of a room. Based on the first frame 4710 of the video stream, a 3D model may be constructed (e.g., as discussed at operation S16 of FIG. 2). For example, a 3D model 4720 includes elements 4721 corresponding to e.g., table and walls in the first frame 4710 of the video stream.

Figure 8B:
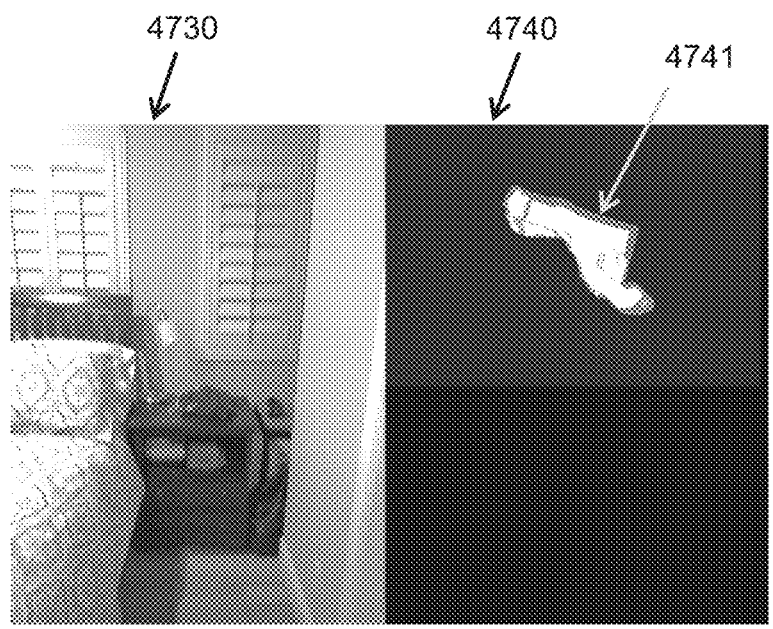

FIG. 8B shows a second frame 4730 of the video stream associated with a second portion of the room. Based on the second frame, the 3D model may be updated/constructed (e.g., as discussed at operation S16 of FIG. 2). For example, an updated 3D model 4740 includes additional elements 4741 corresponding to e.g., a bed and table in the second frame 4720 of the video stream. The updated 3D model 4740 may also include updated information related to the first frame 4710. As an example, in the updated 3D model 4740, shapes and sizes of the elements 4721 and 4741 may be updated.

Figure 8C:
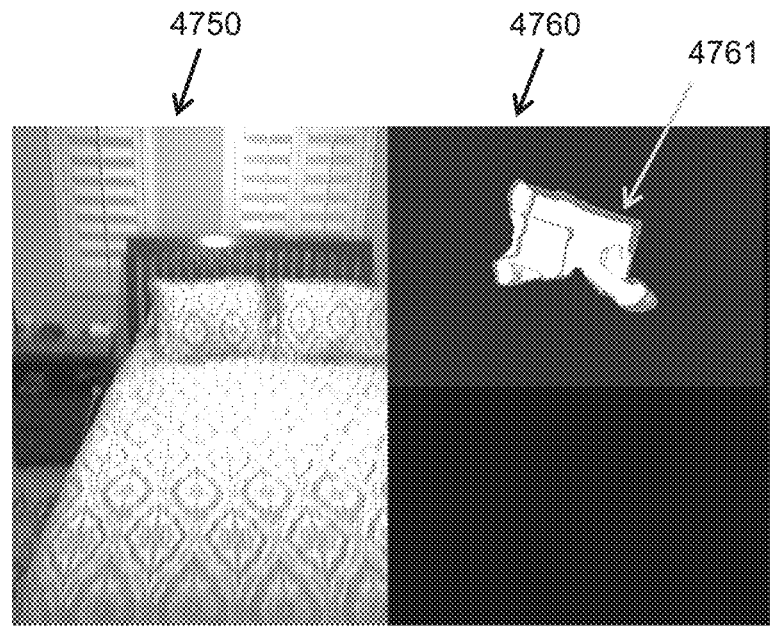
Figure 8D:
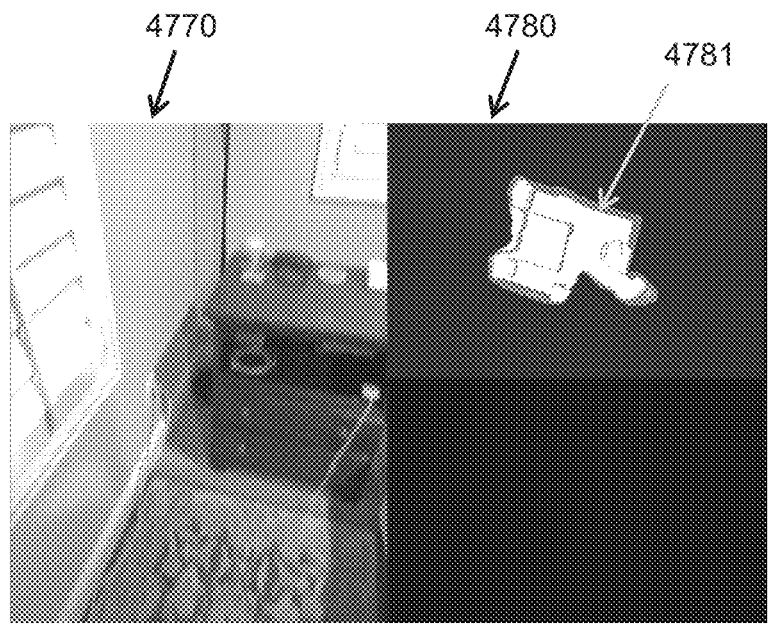
Figure 8E:
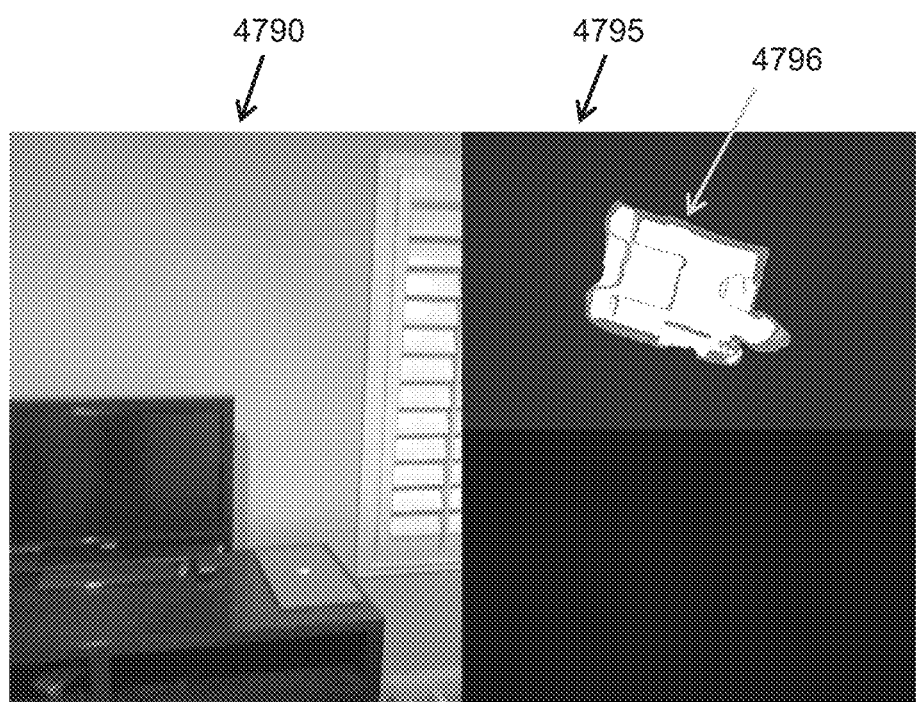
Figure 8F:
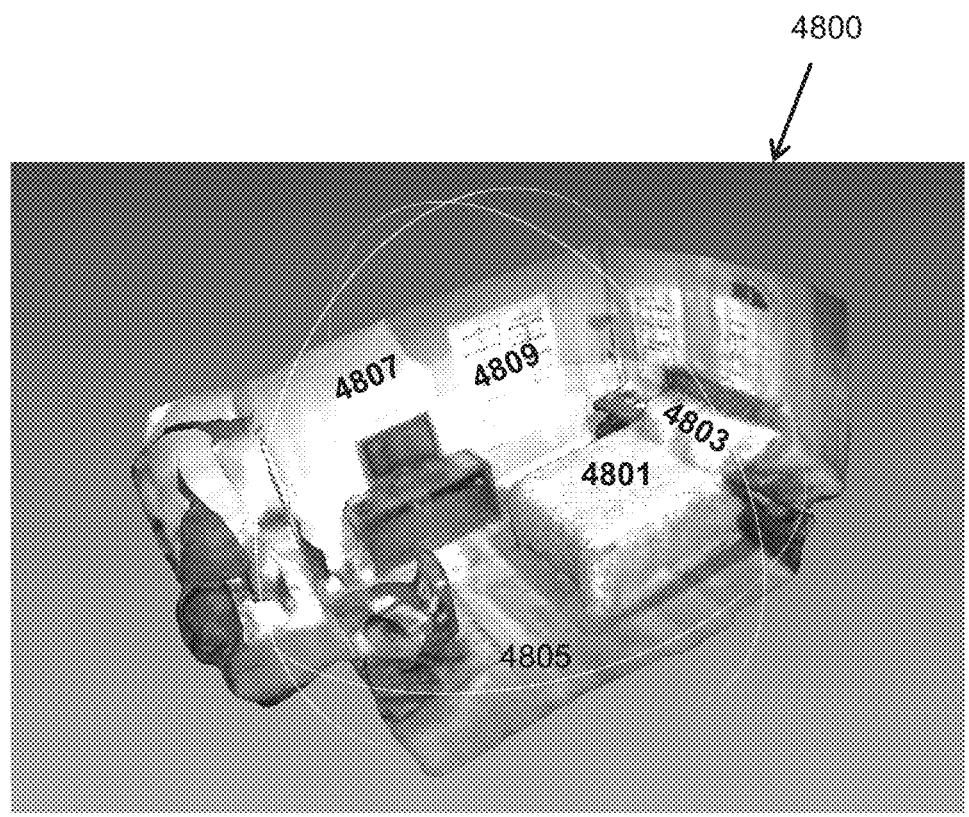
FIG. 8F illustrates a 3D model of the virtual representation constructed according to images of FIGS. 8A-8E, according to an embodiment.
Figure 8G:
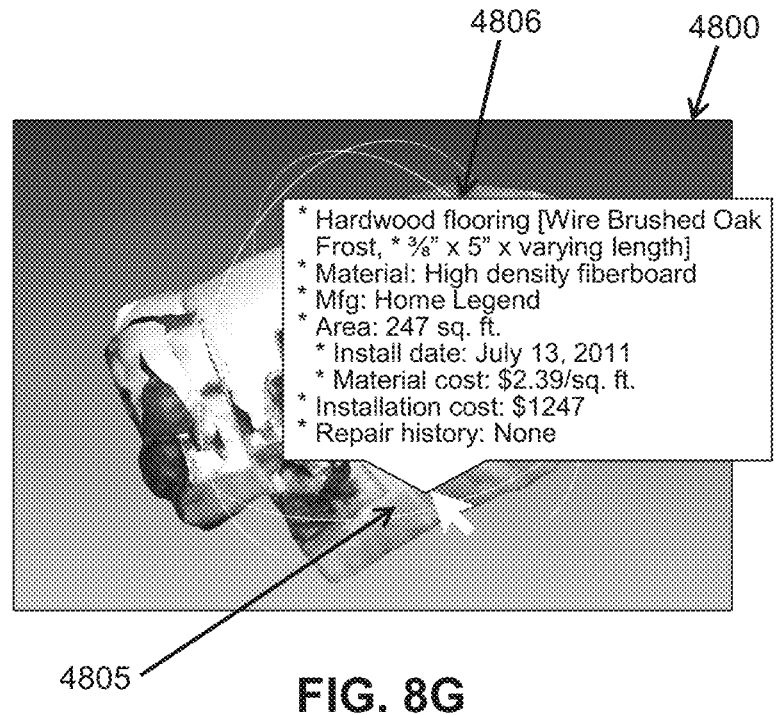
FIGS. 8G-8H illustrate example virtual representation showing metadata of a floor and an element (e.g., TV), respectively, according to an embodiment.
Figure 8H:
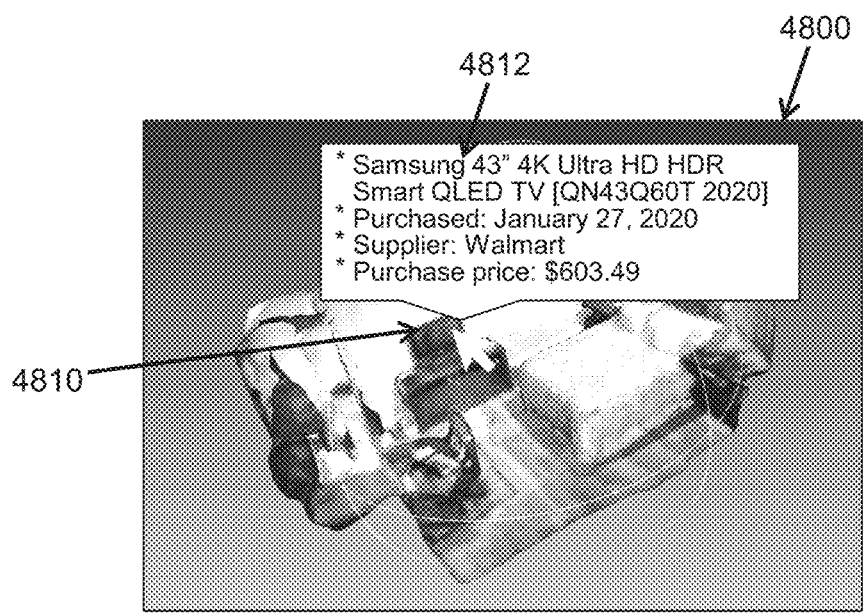

Similarly, FIG. 8C shows a third frame 4750 of the video stream associated with a third portion of the room may be captured or obtained from a video stream of the room. Based on the third frame, the 3D model may be updated/constructed (e.g., as discussed at operation S16 of FIG. 2). For example, an updated 3D model 4760 includes additional elements 4761 corresponding to e.g., a bed and table of the third frame 4750 of the video stream. The updated 3D model 4760 may also include updated information related to the first and second frames 4710 and 4730 of the video stream, respectively. As an example, in the updated 3D model 4740, shapes and sizes of the elements 4721 and 4741 may be updated based on relative positioning with respect to other elements.

Similarly, as discussed above, FIGS. 8D and 8E show a fourth frame 4770 of the video stream associated with a fourth portion, and a fifth frame 4790 of the video stream associated with a fifth portion, respectively, of the room. Based on the fourth and fifth frames, the 3D model may be further updated/constructed (e.g., as discussed at operation S16 of FIG. 2). For example, an updated 3D model 4780 and 4795 include additional elements 4781 and 4796, respectively, corresponding to elements of the respective frames of the video stream of the room. The updated 3D model 4780 and 4795 may also include updated information related to the first, the second, the third, or other previous frames. As an example, in the updated 3D models 4780 and 4795, shapes and sizes of the elements 4721, 4741, 4761, 4781, or 4796 may be updated based on geometry, relative position, pose data, or other data derived from the frames of the video stream.

According to an embodiment, when a user employs a smartphone, tablet, or other computer comprising a display and either a RGB-D image capturing device or a metric posed RGB image capturing device, the user can both capture the images and video with associated depth maps and camera information and visualize the construction of the 3D model in real-time. In these cases, the graphical user interface provides real-time visual feedback during the construction process.

According to an embodiment, when a user is capturing RGB-D images and video, the graphical user interface provides a view of the visual information being captured by the camera, comprising RGB images or video and, optionally, the associated depth maps. The graphical user interface can display the view of the scene as captured by the camera as a continuous stream of RGB frames. The depth map can be visualized using a picture-in-picture or split-screen view on the stream. The depth map can be color-coded or grayscale to denote the distance of the physical scene from the camera.

In an embodiment, the 3D model construction is performed directly on the capturing device (e.g., assuming the processing capabilities are sufficient) using the relevant methodology described in embodiment 1 or embodiment 2. The 3D model construction is performed simultaneously with the visual media capture, which enables real-time visual feedback to be displayed to the user through the graphical user interface.

During the real-time 3D model construction, areas of the scene that come into the field of view of the camera but are not yet incorporated into the 3D model being constructed can be visually indicated via the graphical user interface through variation in highlights, transparency, tint, and color, among other indicators. These indicators may be overlaid on the stream of video frames. Other real-time visual indicators of the progress of the 3D model construction include, but are not limited to: superimposing a wireframe of a 3D mesh (e.g. see wireframe view 5410 in FIG. 15B) representing the 3D model (e.g., see 3D model 5400 in FIG. 15A) being constructed; a static or interactive picture-in-picture or split-screen rendering of the 3D model being constructed; and a constantly updating picture-in-picture or split-screen view of a map of the scene including the 3D model being constructed along with the users location relative to the captured geometry.

In an embodiment, when a user is capturing metric posed RGB images and video, the graphical user interface provides a view of the visual information being captured by the camera, comprising images or video. The graphical user interface can display the view of the scene as captured by the camera as a continuous stream of video frames.

The methodology for real-time 3D model construction using metric posed RGB images may involve off-device processing, and a resulting mesh or a rendering thereof may be transmitted back to the device at interactive speeds (e.g., as discussed in embodiment 3). When each update to the 3D model or new rendering thereof is received by the capturing device, it may be displayed to the user through the graphical user interface via a picture-in-picture or split-screen view with the stream of RGB frames.

In both cases above, audio, visual, and/or natural language indicators may be displayed to the user to assist with the capture process. Examples of such indicators include, but are not limited to: messages to adjust a speed with which the user moves the camera; arrows superimposed on the screen denoting regions that need to be captured; and quality indicators denoting a confidence in the geometric fidelity of the 3D model; among others.

As discussed herein, the updating or reconstruction of the virtual representation VIR may also be performed offline. For example, the video or images of the room (e.g., images 4710, 4730, 4750, 4770, and 4790 of FIGS. 8A-8E) may be stored on one or more servers and the virtual representation may be generated offline.

In an embodiment, the captured RGB-D, the metric posed RGB images, or videos may be used to construct a 3D model offline, after the data is captured by relevant devices discussed herein. To enable offline construction, the graphical user interface may be provided with a capability for a user to upload the captured data (e.g., digital media) to a server. Subsequently, the user may visualize the construction process through the graphical user interface in real-time during the stages of constructing the 3D model. In an embodiment, the graphical user interface may display the 3D model construction, and optionally also displays the associated captured data (e.g., video or images).

In an embodiment, the process of constructing the 3D model using the RGB images and videos is discussed in the embodiment 4 earlier. In an embodiment, the construction is not performed in real time. To enable offline construction, the graphical user interface may be provided with a capability for a user to upload the captured data such as digital media (e.g., the RGB images and videos). In an embodiment, the uploaded data may be used to construct the 3D model using the method of the embodiment 4. When a user interaction is needed, such as for determining a metric scale, the graphical user interface may display the requisite images and instructions to the user and receive interactive user inputs. Once construction of the 3D model is complete, the graphical user interface may enable the user to inspect and review the 3D model.

Alternatively, the graphical user interface may provide a capability for a user to upload a previously constructed 3D model to form the basis of the virtual representation. This previously constructed 3D model of a scene may have been constructed using capturing devices and technologies available to the user or may have been manually constructed using CAD software for creating such models.

FIG. 8F illustrates a final 3D model 4800 of the room constructed according to discussion with respect to FIGS. 8A-8E above. In the 3D model 4800, elements of the location include a bed 4801, pillows 4803, a floor 4805, a wall 4807, and a window 4809, among others. In an embodiment, the 3D model may be configured to further semantically identify each of the elements in the room. Furthermore, a virtual representation may be generated by spatially localizing metadata in the 3D model. For example, as shown in FIG. 8G, metadata 4806 of the floor region 4805 includes material, size, area, date, any repair information, installation cost, etc. As shown in FIG. 8H, metadata 4812 of a TV 4810 may include type of the TV, data of purchase, supplier, purchase price, etc.

Figure 9:
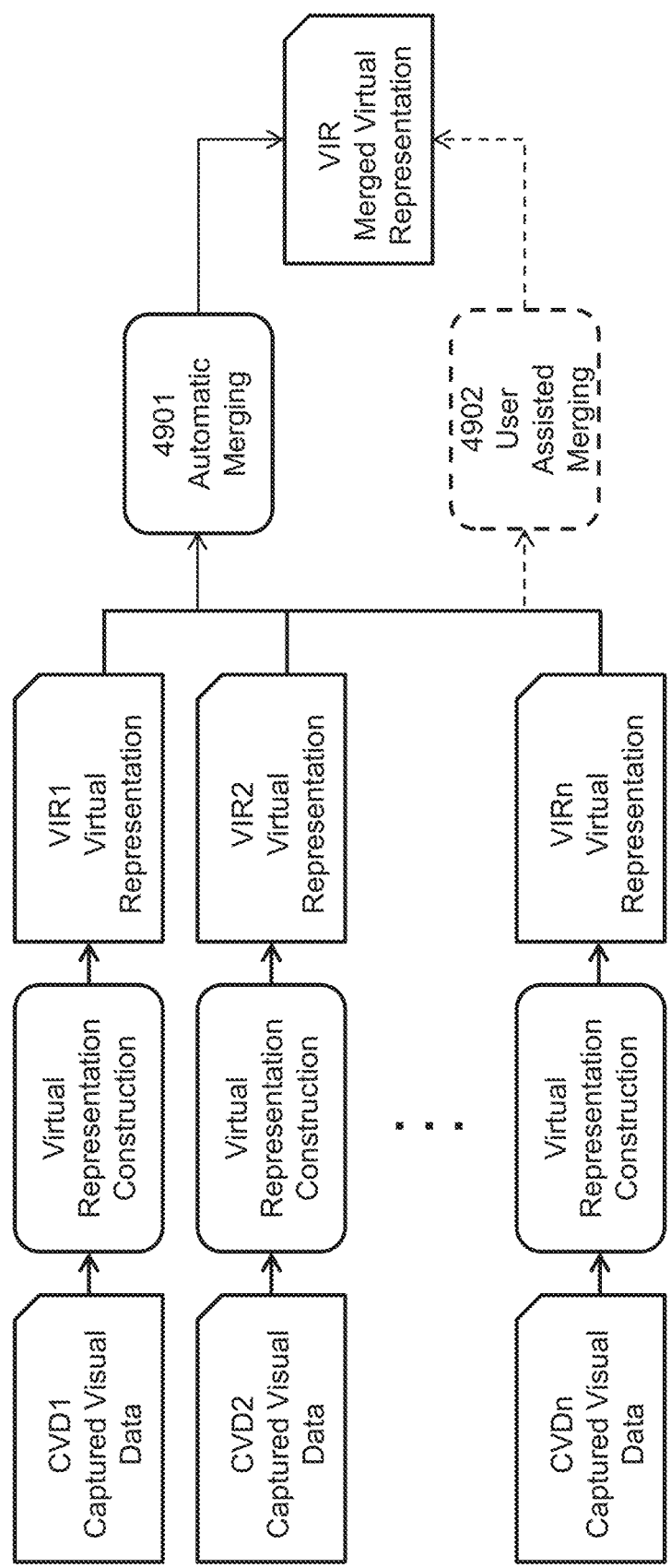
FIG. 9 is a block diagram of merging different virtual representations generated from multiple scans, according to an embodiment.

In an embodiment, referring to FIG. 9, multiple virtual representations may be generated and merged. For example, a user may capture a set of visual data CVD1, CVD2, . . . , CVDn. For each of the visual data, a corresponding virtual representation (e.g., VIR1, VIR2, . . . , VIRn) may be generated (e.g., as discussed above with respect to the operation S18). In an embodiment, a user may select two or more virtual representations to merge into a single virtual representation. The merging process may be performed fully automatically at operation 4901 or with assistance from the user at operation 4902. At operation 4901, the registered images and 3D models from each selected virtual representation may be aligned using an optimization algorithm based on overlapping fields of view of the registered images and the geometries of the 3D models. At operation 4902, the user may select a plurality of corresponding points between all selected representations, then an optimization algorithm may be performed to minimize the distance between the sets of corresponding points in order to align the selected virtual representations. After the merging process, a merged virtual representation VIR may be obtained.

In an embodiment, the methods herein may further include additional operations to generate information about a layout of the location, such as a floor plan. In an embodiment, the floor plan may be manually specified through the graphical user interface and spatially localized within the context of the 3D model on the virtual representation. An example of generating and spatially localizing the floor plan is further discussed with respect to FIGS. 12 and 13A-13F.

Figure 12:
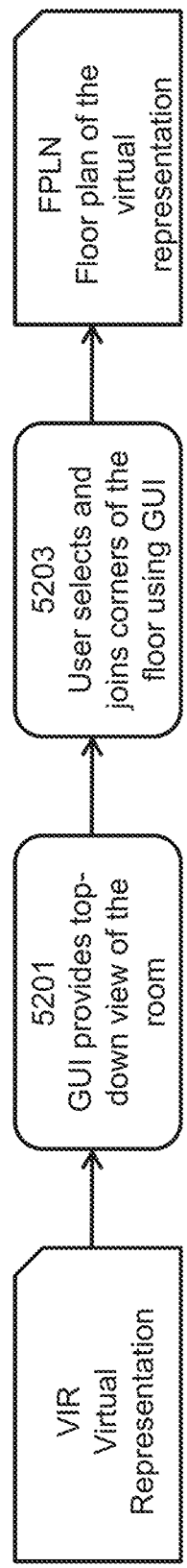
FIG. 12 is a block diagram of generating a floor plan based on a virtual representation, according to an embodiment.

As an example, a floor plan of the location may be generated using operations 5201 and 5203 (in FIG. 12). At operation 5201, the graphical user interface may provide a top-down virtual view (e.g., 3D model) of a scene. At operation 5303, a user may select and join corners of a floor in the 3D model using the graphical user interface.

In an embodiment, the floor plan may be generated automatically, or by user interaction. In an embodiment, the operations may include specifying points of interest within the virtual representation VIR displayed on a graphical user interface; generating, based on the points of interest, a floor plan; and spatially localizing the floor plan on to the virtual representation VIR.

In an embodiment, automatic generation of the floor plan may comprise employing a layout estimation algorithm configured to use curves, polygons, or polyhedra in the images or 3D model, plane information related to the elements in the 3D model, vanishing points in captured images of the location, or geometric indicators related to the 3D model to estimate the floor plan of the location. In an embodiment, the layout estimation algorithm may be further configured to generate or update the floor plan based on constraints and heuristics, the heuristics comprising orthogonal junctions of the location, planar assumptions about a composition of the location, and layout assumptions related to the location, such as Manhattan World, cuboid, or planar priors, among others. In an embodiment, the layout estimation may involve identifying corners on a 2D top view of a 3D model, and performing curve fitting using filtering algorithms such as random sample consensus (RANSAC), polygon approximation of the 2D top view contour, or other algorithms. An example of RANSAC algorithm is described in "*Random sample consensus: a paradigm for model fitting with applications to image analysis and automated cartography*, M. Fischler and R. Bolles; Commun. ACM, 1981, vol. 24, pages 381-395."

In an embodiment, the layout estimation algorithm includes executing an algorithm such as including a mathematical model, a geometry estimation model, a machine learning model, or other algorithm configured to generate a layout of a 3D model. In an embodiment, the model may be configured to generate the floor plan using inputs comprising the images, curves, planes, points, and geometric indicators.

Figure 13A:
FIG. 13A is a 3D model of a room for which a floor plan is to be generated, according to an embodiment.

FIG. 13A illustrates a virtual representation including a 3D model 5200 of a room. FIGS. 13B-13F illustrate example selection of points and generation of polygons for generating a floor plan. In the present example, a single polygon is incrementally drawn. As a new point is selected by the user, the polygon shape changes. The polygon shape can also change fluidly (e.g., change constantly in a smooth manner) using a mouse, according to an embodiment of the graphical user interface.

Figure 13B:
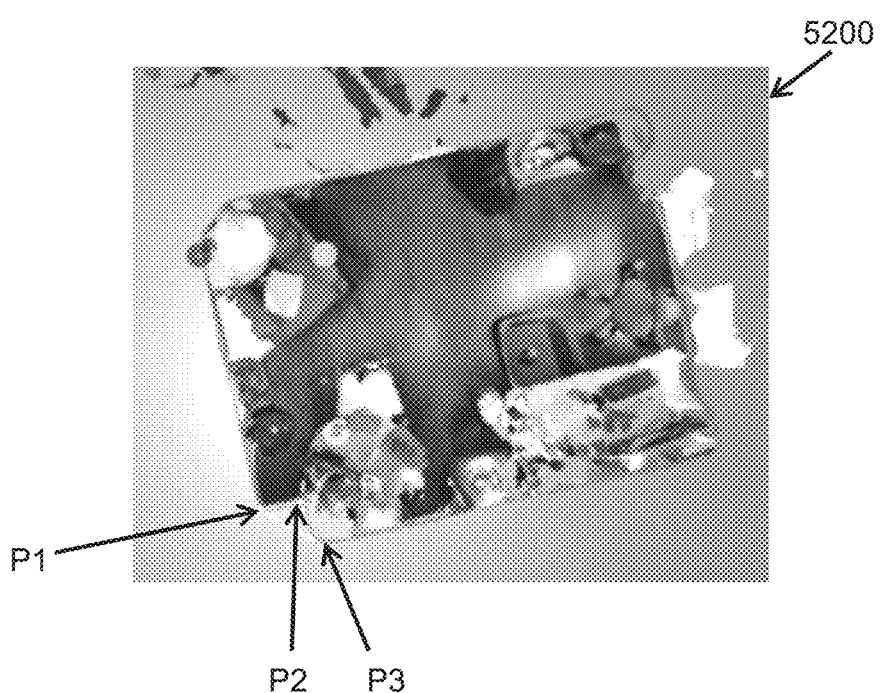
FIGS. 13B-13E illustrate examples of selecting points within the 3D model and generating a polygon for creating the floor plan, according to an embodiment.
Figure 13C:
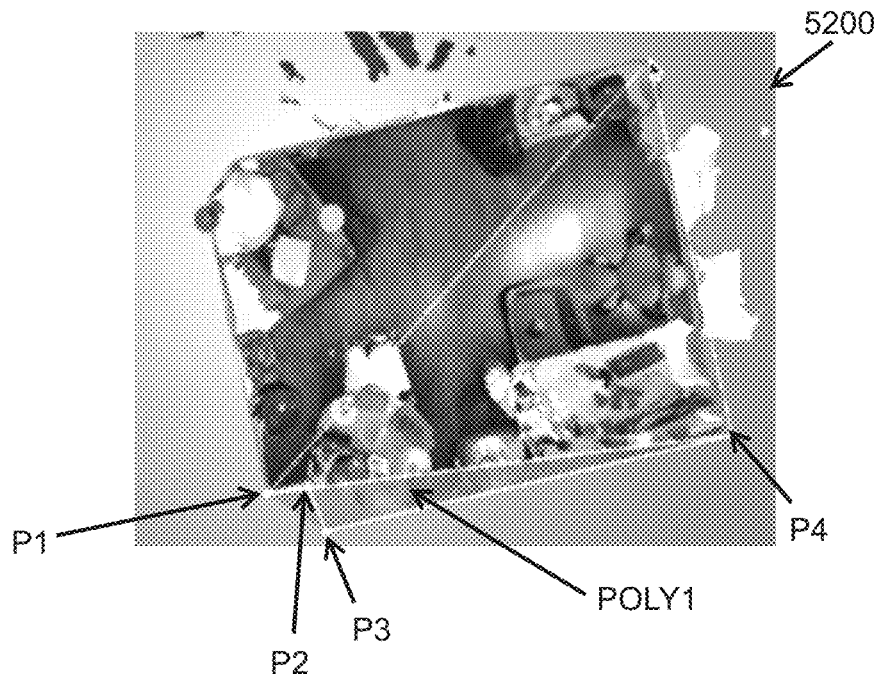
Figure 13D:
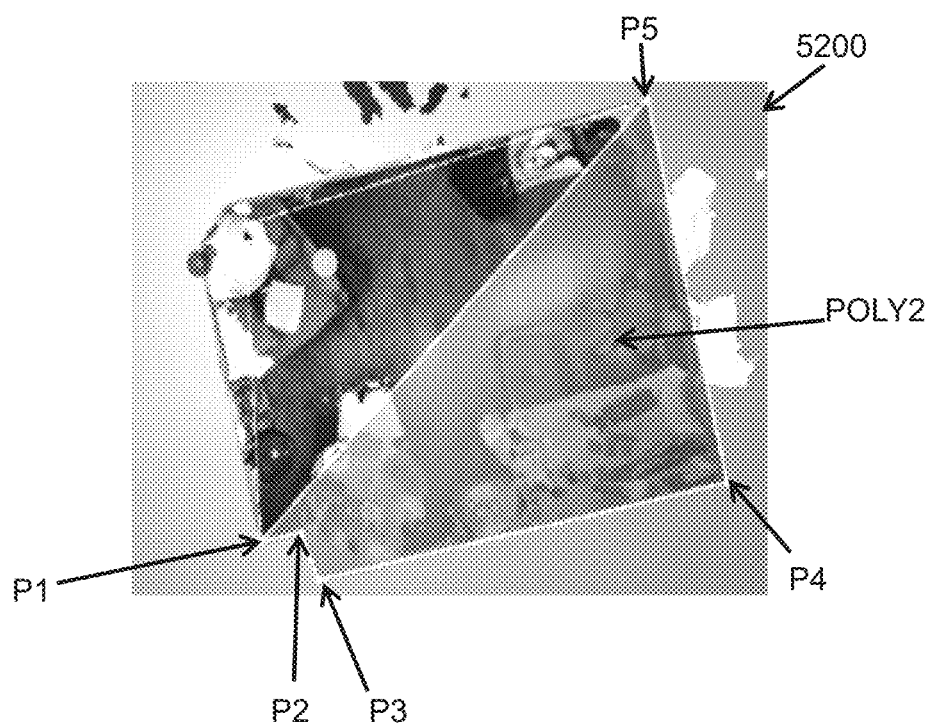
Figure 13E:
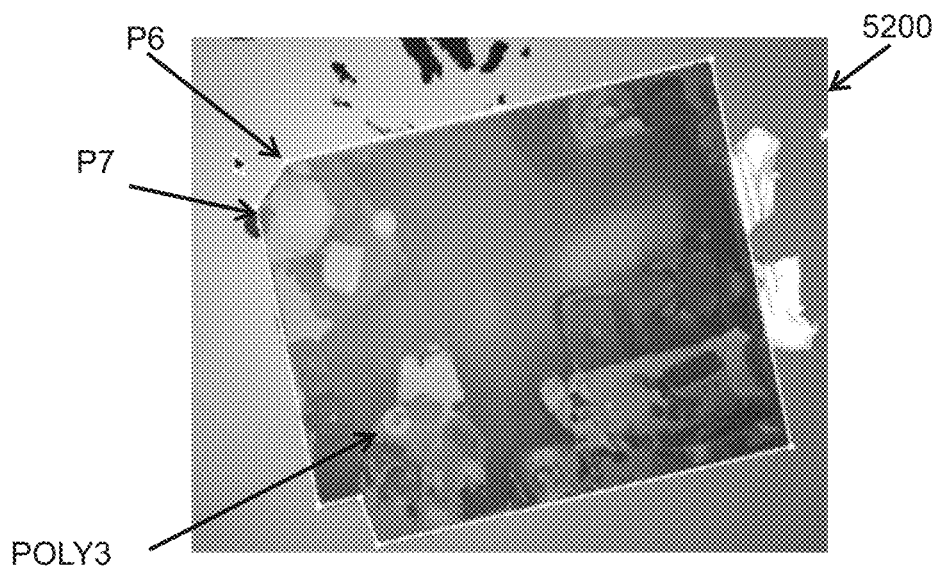
Figure 13F:
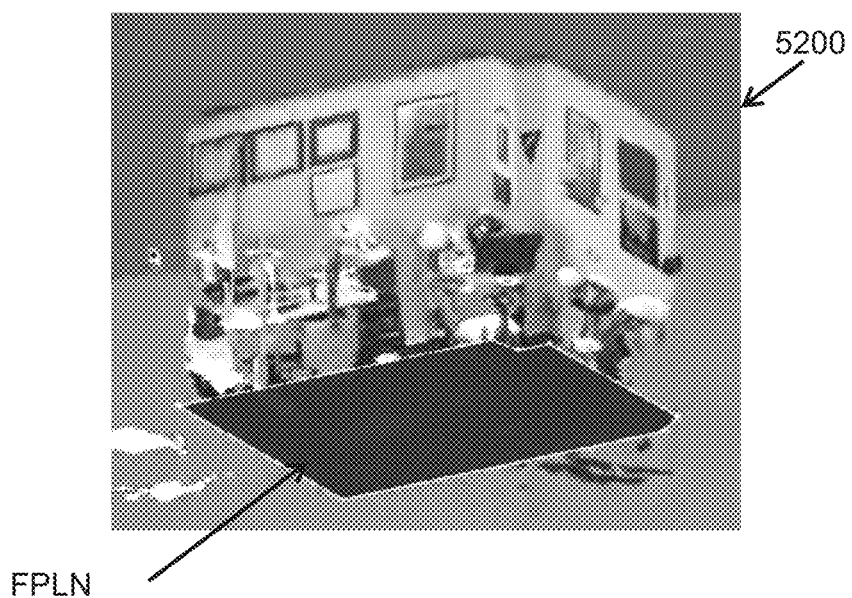
FIG. 13F illustrates the floor plan (e.g., generated in FIGS. 13B-13E) overlaid on a floor of the 3D model, according to an embodiment.

In FIG. 13B, corner points such as P1, P2 and P3 of a portion of the room may be selected on the graphical user interface. FIG. 13C illustrates a first polygon POLY1 created using the selected points P1, P2, P3 and P4. Further, the user may select another corner point P5 (shown in 13D) which causes a change in polygon shape to POLY2. Further, the user may select additional points P6 and P7 (shown in FIG. 13E) causing a further change in the polygon shape POLY2 to generate a final polygon POLY3, as shown in FIG. 13E. For user convenience and for accurate selection or depictions, the generated polygons POLY1, POLY2 and POLY3 may be viewed as a top view of the 3D model, as shown. The generated polygons POLY1, POLY2, or POLY3 may also be edited or adjusted to more accurately map a floor of the 3D model. The final polygon POLY3 refers to the floor plan FLPN, which can be overlaid on the 3D model 5200 as shown in FIG. 13F. In an embodiment, overlaying the floor plan FLPN may involve reorienting the final polygon POLY3 according to the orientation of the 3D model.

In an aspect, the methods described herein may be implemented by combining one or more operations discussed above. For example, referring to FIG. 16, a method of generating a virtual representation of a location with spatially localized information of elements within the location being embedded in the virtual representation involves determination or estimation of a scale factor based on a plurality of images and heuristic information (e.g., as discussed with respect to the embodiment 4 above). In an example implementation, the method includes operations S22, S24, S26, S28, and S29.

Operation S22 (similar to operation S12 of FIG. 2) involves receiving description data of a location. For example, the description data may be generated by a camera, a user interface, an environment sensor, an external location information database, or other sensors or devices configured to generate description data. In an example, the description data may be a plurality of images of the location.

Operation S24 (similar to operation S14 of FIG. 2) involves generating, via a machine learning model, a 3D model of the location and elements therein. The machine learning model may be configured to receive the plurality of images as input and predict the geometry of the location and the elements therein to form the 3D model.

Operation S26 involves obtaining, via a database or a user, heuristic information associated with one or more elements detected within the location, the heuristic information comprising dimension data associated with an element.

Operation S28 (similar to operation S12 of FIG. 2) involves estimating, based on the heuristic information and geometric correlation between the plurality of images, a scale factor for adjusting sizes of the elements in the images.

Operation S29 involves estimating, based on the scale factor, dimensions of the elements within the location.

In an embodiment, based on the estimated scale factor and the estimated dimensions, the virtual representation of the location may be updated by adjusting sizes of the elements within the location and annotating the 3D model with estimated dimensions of the elements of the location.

Figure 16:
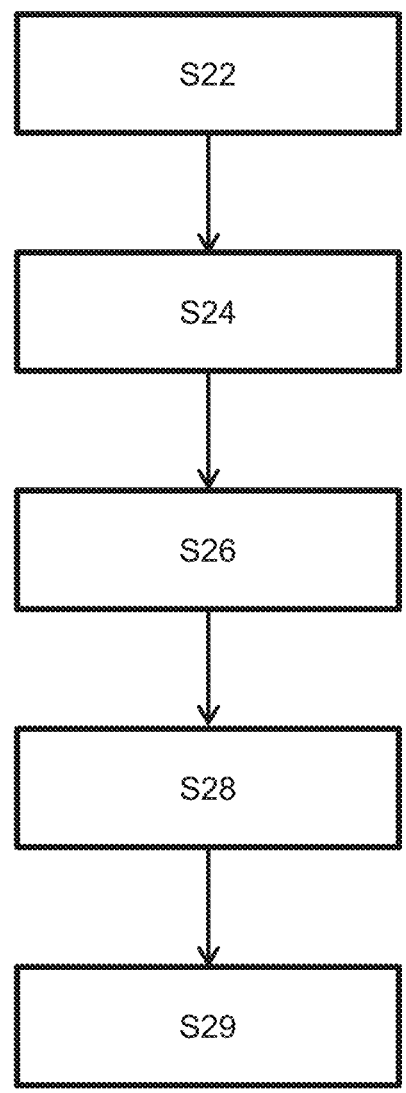
FIG. 16 is a flow chart of a method for generating a virtual representation based on heuristic based estimation of a scale factor, according to an embodiment.

In an embodiment, the method of FIG. 16 may further include estimating pose matrices and intrinsics for each image of the plurality of images by a geometric reconstruction framework configured to triangulate 3D points based on the plurality of images to estimate both camera poses up to scale and camera intrinsics. The pose matrices and intrinsics may be input to the machine learning model to accurately predict the 3D model of the location. In an embodiment, the geometric reconstruction framework includes, but is not limited to, a structure-from-motion (SFM), or simultaneous localization and mapping (SLAM).

In an embodiment, the method may further include estimating metric depth maps for each image of the plurality of images, and inputting the depth maps to the machine learning model to accurately predict the 3D model of the location.

In an embodiment, the method may further include obtaining metadata associated with the elements within the location; and generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata.

In an embodiment, the method may further include generating a floor plan (e.g., as discussed with respect to FIGS. 13A-13F). For example, the floor plan may be generated by specifying points of interest within the virtual representation displayed on a graphical user interface; generating the floor plan using the points of interest as input to a machine learning model or a geometric model; and spatially localizing the floor plan on to the virtual representation.

As mentioned earlier, a floor plan of the location may be generated by a layout estimation algorithm configured to use lines in the 3D model, plane information related to the elements in the 3D model, vanishing points in captured images of the location, or geometric indicators related to the 3D model to estimate the floor plan of the location. In an embodiment, the layout estimation algorithm is further configured to generate or update the floor plan based on constraints and heuristics, the heuristics comprising orthogonal junctions of the location, planar assumptions about a composition of the location, and other layout assumptions related to the location. In an embodiment, the layout estimation algorithm includes a machine learning model (e.g., a neural network) or geometric models configured to generate the floor plan using the curves, planes, points, and geometric indicators as inputs.

The methods of the present disclosure may be extended further depending on application-specifications, modifications and/or particular viewing desires for the virtual representation. The following description provides additional operations that may be performed on a graphical user interface and a virtual representation.

In an embodiment, a graphical user interface may be configured to view or modify the virtual representation (e.g., as shown in FIGS. 8F-8H, and 14A-14B). The graphical user interface may provide a library of all virtual representations captured by a user. The user may select a specific virtual representation from this library to view in more detail. Upon selecting a specific virtual representation to view, the user may change the view of the virtual representation in the graphical user interface with six degrees of freedom (e.g., forward/back, left/right, up/down, roll, pitch, yaw). In an example, where the user uses a mouse and keyboard, this capability may be provided through a combination of clicking and holding mouse button(s) or key(s) on a keyboard. In another example, where the user uses a touch screen, this capability may be provided through a combination of touches, holds, and gestures. The user may also select elements of a 3D model by clicking, tapping the screen, or gesturing through the graphical user interface. These selections may be individual or multiple elements, and initial selections may be extended and grown by subsequent clicks, touches, or gestures. Additionally, a user may view the virtual representation as an ordered or unordered arrangement of the annotations and metadata. By selecting specific annotations and metadata, the user may automatically be shown the relevant view of the 3D model with the selected information indicated thereon.

In an embodiment, a user may select one or more elements of the 3D model (e.g., in FIG. 11A-11C) in the virtual representation and specify the selection for removal. In an example, the user may choose to simplify the geometry of the 3D model represented as a 3D mesh (e.g., see FIG. 15B) by applying mesh simplification algorithms such as quadric edge collapse, among others, to reduce the number of mesh elements and simplify the geometry. In an example, the user may crop the 3D model represented as a 3D mesh to only contain the mesh elements within a user-specified and modifiable 3D region, and all mesh elements that fall outside of the specified region may be removed. In yet another example, the user may select and move elements within the 3D model. For example, elements of the 3D model that have been annotated as the same object may be selected and moved from their original place (e.g., corner of a room) to another place (e.g., center of a room) in the 3D model. These modifications may be available for a specified period of time or be permanent.

In an embodiment, a user may create and spatially localize geometries comprising 3D shapes, objects, and structures in the 3D model. These geometries may comprise geometric primitives, CAD models drawn from a database, or user-provided CAD models. These geometries may be used to indicate a certain type or instance of contents or structure that correspond to a location. Alternatively, these geometries may be used to represent the introduction or desired introduction of new objects to the location. These augmented geometries may themselves be textures and annotated with audio, visual, natural language media and user comments, or a combination thereof.

In an embodiment, an appearance of the virtual representation may be modified. In an example, a user may make temporary or permanent changes to the hue, saturation, brightness, transparency, and other aspects of the appearance of the virtual representation, including elements of its geometry, annotations, and associated metadata. For example, different annotations may be assigned a specific color or made to appear or disappear depending on the user's needs. In another example, the user may view only the wireframe of the 3D model. Similarly, computer graphics techniques such as back-face culling or polygon clipping may be used to modify elements of the 3D model to be displayed to the user through the graphical user interface. Furthermore, the user may filter which annotations in the virtual representation may be visible based on their labels and metadata. For example, a user may enable only annotations that may be labeled as damage to be visible on the virtual representation.

In an embodiment, measuring of a scene or elements thereof may be performed through the virtual representation. A user may measure distances between user-specified points on the 3D model. Additionally, the user may specify curves, polygonal areas, and polyhedral volumes on the 3D model from which angles, distances, surface areas and volumes, may be computed at the metric scale of the corresponding location. These measurements may be displayed for a specified period of time through the graphical user interface or permanently associated with the virtual representation.

In an embodiment, modifications to the virtual representation may be suggested. In an embodiment, a user may suggest modifications to the virtual representation through the graphical user interface. The graphical user interface enables a mode of operation in which the aforementioned modifications may be stored as tentative changes to the virtual representation. The user may later accept or decline these tentative modifications to the virtual representation in part or on the whole. In an embodiment, when more than one user is interacting with the virtual representation, other users may choose to approve or decline these tentative changes in the same way. The tentative changes may be viewed or hidden by a user, and the tentative changes may be displayed not final changes, such as by adjusting the transparency or color of the relevant aspects of the virtual representation.

In an embodiment, a history of interactions may be maintained. For example, the graphical user interface may be configured to enable a user to maintain a log of all interactions with the virtual representation along with identifying information about the user who performed the interaction and the time at which the interaction was performed. In an embodiment, a user may undo any interaction that modified the virtual representation by selecting and reverting to a previous version of the virtual representation. Prior to reversion, a user may view a comparison of the virtual representation's current state and a prior state to which the user intends to revert.

As used herein, referring to FIGS. 17-23 and the discussion above, the terms "AI" may refer to relating to a machine learning model discussed herein. "AI framework" may refer to a machine learning model. "AI algorithm" may refer to a machine learning algorithm. "AI improvement engine" may refer to a machine learning based optimization. "3D mapping" or "3D reconstruction" may refer to generating a 3D model (according to one or more methods discussed herein). "Inventory" may refer to items or elements at a location such as a room.

Figure 17:
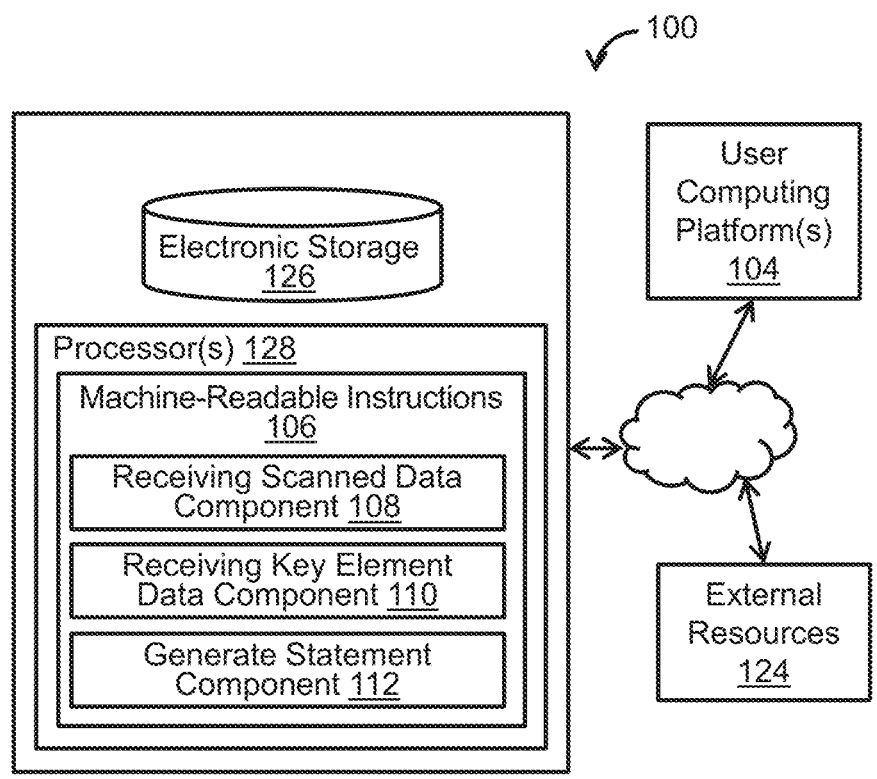
FIG. 17 illustrates a system for providing an artificial intelligence (AI) based generation of a virtual representation and estimates for services provided by a user, according to an embodiment.

FIG. 17 illustrates a system configured for generating a virtual representation, as discussed above with respect to a method in FIG. 2, for example. In some embodiments, the virtual representation may be used for facilitating AI-based estimates for services to be provided by a user e.g., a consultant. In some embodiments, system 100 may include one or more server 102. The server(s) 102 may be configured to communicate with one or more user computing platforms 104 according to a client/server architecture. The users may access system 100 via user computing platform(s) 104.

Digital media items may include one or more of digital photos, images, videos, audio, and/or other digital media items. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

The server(s) 102 and/or computing platform(s) 104 may be configured to execute machine-readable instructions 106. The machine-readable instructions 106 may include one or more of a receiving scanned data component 108, a receiving key element data component 110, a generate statement component 112 and/or other components. In some embodiments, some or all of the components may be located in computing platform(s) 104. The AI work may be performed in one or more of the cloud, a mobile device, and/or other devices. The receiving scanned data component 108 may be configured to receive, at one or more hardware processors, data from a scanning of a location, the scanning performed by one or more of a camera, a computer vision device, an inertial measurement unit, a depth sensor, and/or other scanners. In some embodiments, scanning includes data generated by video and/or image acquisition devices, and/or voice recording devices, a user interface, and/or any combination thereof. The data may be generated responsive to a user request, and/or automatically by the system (e.g., without initiation by a user).

The receiving key element data component 110 may be configured to receive, at one or more hardware processors, data related to the identification of one or more key elements at the location. The generate statement component 112 may be configured to generate, at one or more processors, an itemized statement and quote of work to be performed. Various other components are contemplated. For example, a launch indication component may be configured to receive, at one or more hardware processors, an indication of a launch of an app or other messaging channel. As another example, one or more of components 108, 110, 112, etc. may include sub-components related to the virtual representation, insurance (e.g., as described herein), and/or other applications of the present systems and methods.

In keeping with some embodiments according to the present disclosure, estimating the cost for home painting may be a function of predicting the amount of material needed and/or the duration to complete the job. Generating cost estimates automatically through algorithms may be desirable since most painting companies currently require their employees to physically inspect the paint site before the job, which increases the cost of the painting service or to reduce the time it takes for on-site estimators to provide the cost estimate. In an embodiment, the estimation is based on the virtual representation generated as discussed herein.

To estimate the amount of material needed and/or the work duration, several factors may need to be considered including the surface area of the components to paint, and/or other factors. Other factors may include one or more of surface type, surface texture, surface material, preparation work, blemishes, cleanup work, and/or other factors.

Surface type may include wall, baseboard, trim, ceiling, door, and/or other surface types. Paint type may be determined based on the surface type (e.g., high gloss white for trim, eggshell for walls, flat white for ceiling).

Surface texture and/or surface/material may include flat, textured, and/or other surface texture and/or surface/material. Surface texture and/or surface/material may determine how many coats of paint may be needed. Preparation work may include repairing blemishes such as old paint colors, ding/dents, scratches, marks, and/or other blemishes.

Other factors may include determining if primer, patching, sanding, caulking, and/or sealing may be needed. Other preparation work may include moving furniture, decor, and/or other items. Further preparation work may further include covering carpets, furniture, home wares, and/or other items. Still further preparation work may include removing, replacing, and/or covering electrical face plates and/or light switches. Other preparation work may include plant covering and/or protection. Other preparation work may include washing surfaces to be painted. Cleanup work may include disposing coverings, disposing leftover paint, and/or other cleanup work.

The present disclosure involves using computer vision using cameras and optional depth sensors on the smartphone and/or inertial measurement unit (IMU) data (e.g., data collected from an accelerometer, a gyroscope, a magnetometer, and/or other sensors) in addition to text data: questions asked by a human agent or an AI algorithm based on sent RGB and/or RGB-D images and/or videos, and previous answers as well as answers by the consumer on a mobile device (e.g., smartphone, tablet, and/or other mobile device) to come up with an estimate of how much it will cost to perform a moving job, a paint job, and/or other services. These examples are not intended to be limiting.

In some embodiments, a workflow may include a user launching an app or another messaging channel (SMS, MMS, web browser, etc.) and scanning a location (e.g., a home and/or another location) where camera(s) data and/or sensor(s) data may be collected. The app may use the camera and/or IMU and optionally a depth sensor to collect and fuse data to detect surfaces to be painted, objects to be moved, etc. and estimate their surface area data, and/or move related data, in addition to answers to specific questions. An AI algorithm (e.g., neural network) specifically trained to identify key elements may be used (e.g., walls, ceiling, floor, furniture, wall hangings, appliances, and/or other objects). Other relevant characteristics may be detected including identification of light switch/electrical outlets that would need to be covered or replaced, furniture that would need to be moved, carpet/flooring that would need to be covered, and/or other relevant characteristics.

For an example, related to painting, the user may optionally enter what brands of paint may be preferred for each area. Areas may include wall, trim, ceiling, baseboard, door, and/or other areas. The messaging channel may sell leads to paint suppliers to promote their products in relevant spaces. This may be optionally implemented as an automated advertising network where the bidding process may be started by an algorithm determining a category of product that would be useful to the consumer (e.g., high gloss trim paint), then auctioning off ad real estate to the highest bidder in the category (e.g., suggesting a first manufacturer versus a second manufacturer, for example).

In some embodiments, a consumer app working along with a backend infrastructure may generate an itemized statement of work. For example, a 3D model may include semantic segmentation or instance segmentation annotations for each element of the room. Based on dimensioning of the elements further application specific estimations or analysis may be performed. As an example, for one or more rooms, the system may give an estimated square footage on walls, trim, ceiling, baseboard, door, and/or other items (e.g., for a painting example); the system may give an estimated move time and/or move difficulty (e.g., for a moving related example), and or other information.

Figure 18:
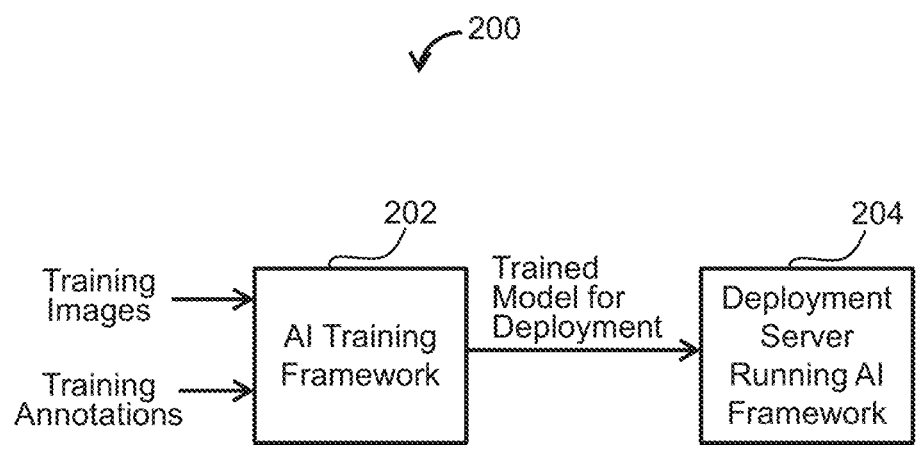
FIG. 18 illustrates an AI model that may be trained to recognize objects/surfaces, according to an embodiment.

FIG. 18 illustrates an artificial intelligence (AI) model 200 that may be trained to recognize objects, in accordance with one or more implementations. Multiple training images with objects that need to be detected may be presented to the artificial intelligence (AI) framework 202 for training. Training images may contain non-objects such as walls, ceilings, carpets, floors, and/or other non-objects. Each of the training images may have annotations (e.g., location of objects of desire in the image, coordinates, and/or other annotations) and/or pixel wise classification for objects, walls, floors, and/or other training images. Responsive to training being complete, the trained model may be sent to a deployment server 204 running an AI framework. It should be noted that training data is not limited to images and may include different types of input such as audio input (e.g., voice, sounds, etc.), user entries and/or selections made via a user interface, scans and/or other input of textual information, and/or other training data. The AI algorithms may, based on such training, be configured to recognize voice commands and/or input, textual input, etc.

The deployment server 204 may be a standalone server and/or a module that may be deployed as part of an app in a user's smartphone, tablet, and/or other personal computing device, in accordance with one or more implementations.

Figure 19:
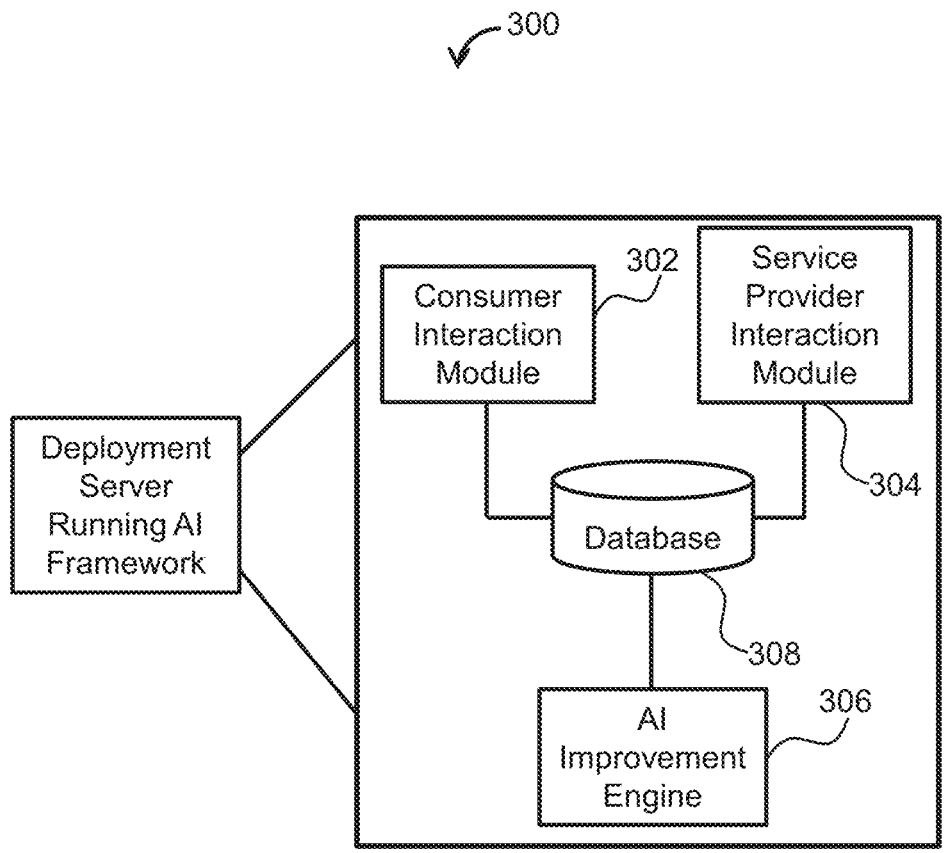
FIG. 19 illustrates an exemplary system wherein a deployment server running an AI framework may include a consumer interaction module, a service provider interaction module, a database, and an AI improvement engine. The AI improvement engine may run on one or more of machine learning algorithms, AI algorithms, and/or other algorithms, according to an embodiment.

FIG. 19 illustrates details of how a deployment server 300 running AI framework may be architected. It may include one or more of a consumer interaction module 302, a service provider interaction module 304, an AI improvement engine 306, a database 308, and/or other elements.

The consumer interaction module 302 may ingest data from a consumer, store the data in database 308, analyze the data with AI models for processing, and possibly communicate a quote back to a consumer. The consumer interaction module 302 may ingest one or more of text, video, pictures, audio, and/or other things from a user.

In some embodiments, the service provider interaction module 304 may serve as an interface to allow service providers to review information from consumers and AI analysis, make corrections if needed, and communicate with a user. The provider interaction module 304 may have the capability for a service provider to review the quote, send it back to the user through the appropriate messaging channel, or export to pdf and send it via another channel.

The AI improvement engine 306 may combine the original analysis output from the AI with any changes made by a consumer, service provider, or dedicated human reviewer and provide feedback to the AI framework to improve the trained model. The AI improvement engine 306 may also host the AI framework which runs multiple machine learning models to be used on the data sent from the consumer as well as a service provider.

Figure 20:
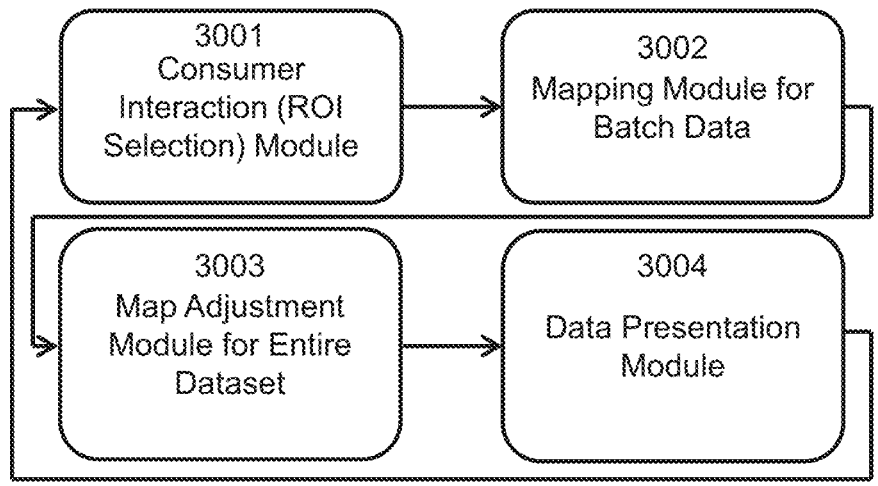
FIG. 20 illustrates an embodiment of a portion of the present system which performs 3D map construction/area estimation in order to estimate the dimensions of inventory items, surfaces, and/or other objects, according to an embodiment.

FIG. 20 illustrates an embodiment of a portion of the present system which performs 3D map construction/area estimation in order to estimate the dimensions of inventory items, surfaces, and/or other objects. Block 3001 is a consumer interaction module similar to and/or the same as corresponding consumer interaction modules described herein. Block 3001 may facilitate selection of a region of interest, or ROI, (of the location) by the user (e.g., via a user interface presented to the user on a user computing platform shown in FIG. 17). Block 3002 is a mapping module that outputs a 3D reconstruction of the inventory in the room/scene/location, which can then be used to estimate item dimensions. For inventory like walls and floor carpet, the user can interactively select an ROI represented in the description data such that estimation can be limited to a specific area/region but not the entire surface/item. The blocks illustrated in FIG. 20 and in other figures are user interactive such that the user can at any point specify a reference item dimension in the description data so that it can be used to scale the related parts of the output to more accurate real world units, using geometric methods. Block 3003 illustrates a post processing module for the mapping module. Once the map (e.g., a 3D model) is created using all the spatio-temporal data, geometric filtering algorithms are applied to this map to create a more consistent/accurate 3D map. Block 3004 summarizes the machine learning output for the input description data and represents the output in the form of either a set of images or with a 3D rendering of the room/scene/location, with its respective identification and dimension information.

A reference object which has standard dimensions can be used to determine the dimensions of other items that are on the same plane as the reference item. One example to consider is if a user wants to estimate the floor plan/dimensions of a house and/or other portions of a location. The present system may be configured such that the user captures images of a room which has a floor made of tiles. A computer vision algorithm, such as mapping/3D reconstruction, that is processing these images can estimate the array of tiles in the scene and the user can then enter the size/dimensions of a single tile. This information can then be used to find the dimensions of other items in the whole scene.

Figure 21:
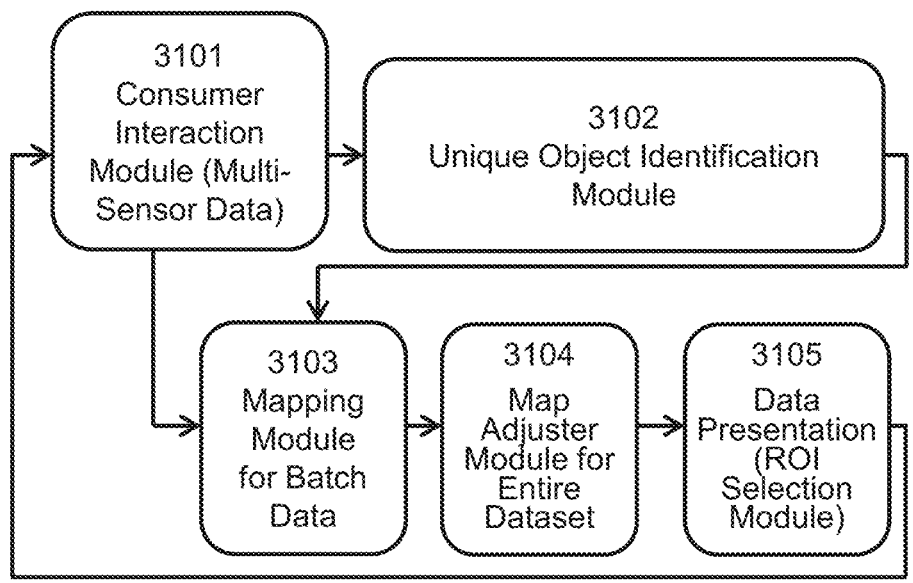
FIG. 21 illustrates another embodiment of the portion of the present system which performs 3D map construction/area estimation in order to estimate the dimensions of inventory items, surfaces, and/or other objects, according to an embodiment.

FIG. 21 illustrates another embodiment of the portion of the present system which performs 3D map construction/area estimation in order to estimate the dimensions of inventory items, surfaces, and/or other objects. Block 3101 illustrates a consumer interaction module similar to and/or the same as corresponding consumer interaction modules described herein. Block 3102 illustrates a unique object identification module similar to and/or the same as corresponding unique object identification modules described herein. Block 3103 illustrates a mapping module for batch data. This module uses detections from the unique object identification module to reconstruct items of interest in 3D. Block 3104 illustrates a post processing module for the mapping module (block 3103). Once the map is created using all the spatio-temporal data, geometric filtering algorithms are applied to this map to create a more consistent/accurate 3D map. Block 3105 summarizes machine learning output across the description data and represents the output in the form of a 3D rendering or a set of images where a region of interest (ROI)/item of interest, for which respective identification and dimension information is outputted.

Using a reference item which has standard dimensions, the dimensions of other items that are on the same plane as the reference item can be determined. For example, consider a scene with a standard wall plate and a whiteboard that are attached to a wall. If the user captures a video while panning across the wall, it's hard to identify the real world units with data only from a monocular camera. In this case the present system can use a machine learning model to identify the items by drawing a 2D bounding box around them, and then, within these bounding boxes, extract the corner points of each item. Based on the view, the items in the image can appear skewed. A coordinate system (x, y) can be assigned to the skewed plane on which the items are and then all the items can be deskewed based on the known shape and corner points of each reference item. By using multiple views of the same scene, depth can be estimated at an arbitrary scale (but not real world scale) and plane dimensions can be calculated. Once the real measurements of the reference item are provided, the whole plane can be scaled accordingly, thereby estimating the real world dimensions.

One example to consider is if a user wants to estimate the floor plan/dimensions of a house. The user captures a video of the room which has a floor made of tiles. A machine learning model (like the ones described herein) is used to identify tiles along with the other items and can count the number of such unique items. Then a mapping module can be used for reconstruction of the scene/room on some arbitrary scale. The user can then enter the size/dimensions of a single tile, which can be used to find the dimensions of the whole scene after rescaling.

Figure 22:
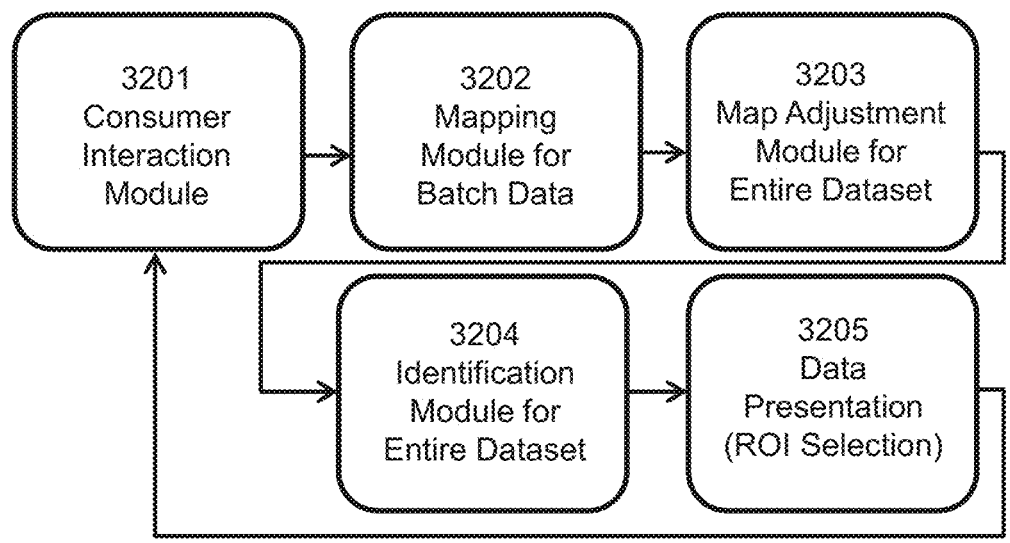
FIG. 22 illustrates another embodiment of the portion of the present system which performs 3D map construction/area estimation in order to estimate the dimensions of inventory items, surfaces, and/or other objects, according to an embodiment.

FIG. 22 illustrates another embodiment of the portion of the present system which performs 3D map construction/area estimation in order to estimate the dimensions of inventory items, surfaces, and/or other objects. Block 3201 illustrates a consumer interaction module similar to and/or the same as corresponding consumer interaction modules described herein. Block 3202 illustrates a module configured to create a 3D map of a room/scene/location from description data. The map generated can sometimes be incomplete due to occlusions, items being far away from the camera view, etc. In order to account for these challenges this module may include, and/or use a machine learning model (e.g., to interpolate between different images, etc.) to make the map more consistent/complete. Block 3203 is a post processing module for the mapping module similar to and/or the same as other corresponding post processing modules described herein. Once the map (e.g., a 3D model) is created using the spatio-temporal data, geometric filtering algorithms may be applied to this map to create a more consistent/accurate 3D map. Block 3204 illustrates a module comprising a machine learning model which reads the 3D map generated from block 3203 and identifies inventory items associated with that map. The identification here in general is a 3D bounding box around the item of interest. One example scenario is using a model, like a 3D convolutional neural network (CNN), on top of a point cloud that specifies a chair which is occluded by an artificial plant in the scene. The model may comprise a 3D bounding box drawn around a chair (for example), specifying the volume of the chair completely so that the dimensions of the chair can be estimated more accurately. Block 3205 summarizes the output across the description data and represents the output in the form of a 3D rendering or a set of images where a user can select any region of interest (ROI) or item of interest, for which respective identification and dimension information is given as output.

Figure 23:
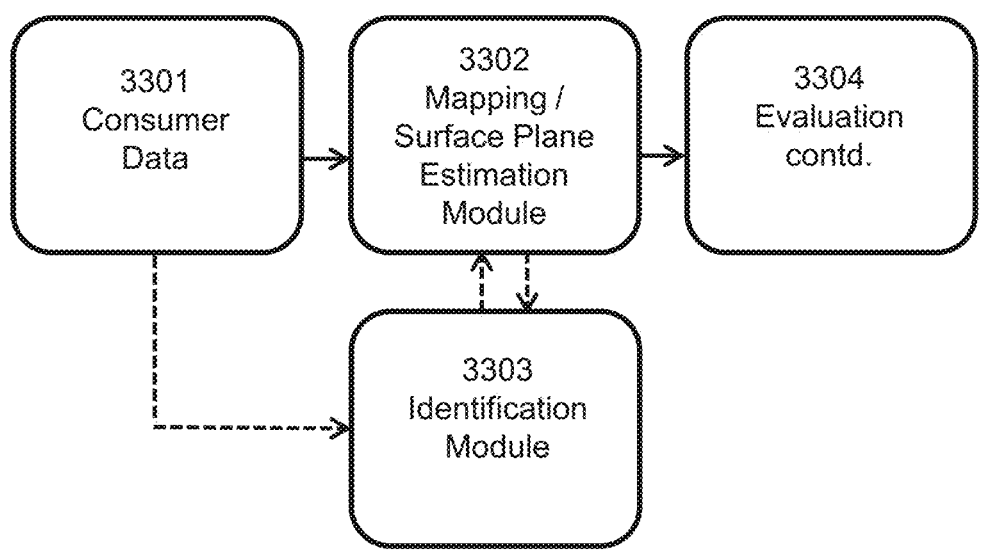
FIG. 23 illustrates another embodiment of the portion of the present system which estimates the dimensions of inventory items, surfaces, and/or other objects, according to an embodiment.

FIG. 23 illustrates another embodiment of the portion of the present system which estimates the dimensions of inventory items, surfaces, and/or other objects. Block 3301 illustrates the description data (e.g., consumer data) from one or more sensors, such as a camera, gyroscope, accelerometer, microphone, etc. Block 3302 illustrates a mapping module similar to and/or the same as the corresponding mapping modules described herein. This module is used to reconstruct the room/scene/location from the description data in 3D such that dimensions of the items can be calculated.

Block 3303 is a machine learning (e.g., AI) identification module similar to and/or the same as the corresponding machine learning/AI identification modules described herein, and is used optionally to help the mapping module reconstruct the scene using different methods. This module can identify the items in the room/scene/location such as furniture, walls, floors, etc., which can be associated with the 3D map. These identifications can be used to group items when estimating replacement value for multiple items that belong to the same category. For example, if the system needs to estimate the replacement/repaint value of a specific set of walls in a room as chosen by an adjuster, the dimensions of the parts of the 3D room map that are identified by the machine learning algorithm as "wall" can be used to automatically arrive at the total square footage of the specific set of walls. The square footage can then be combined with other information such as type of wall (for e.g. drywall) and cost of materials to arrive at a cost for replacement. The adjusters can also manually annotate/identify items on the 3D interactive map. Block 3304 illustrates continued evaluation, which includes replacement market value estimation and data presentation as described herein. (Note that the consumer data block (in FIG. 23) represents a consumer interaction module as described herein, the mapping module (in FIG. 23) collectively represents mapping and map adjuster modules described herein, the identification module (FIG. 23) represents the unique object identification module shown in FIG. 21, and the identification module shown in FIG. 22.

In the following, further features, characteristics, and exemplary technical solutions of the present disclosure will be described in terms of items that may be optionally claimed in any combination:

Item 1: A method generate a virtual representation of a location with spatially localized information of elements within the location being embedded in the virtual representation, the method includes: receiving description data of a location, the description data being generated via at least one of a camera, a user interface, an environment sensor, and an external location information database, the description data comprising at least one image, and pose matrices; receiving metadata associated elements within the location; generating (offline or in real-time), via a machine learning model and/or a geometric model, a 3-dimensional (3D) representation of the location and elements therein, the machine learning model being configured to receive the plurality of image and pose matrices as inputs and predict geometry of the location and the elements therein to form the 3D model; and generating, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata.

Item 2: The method of Item 1, where generating the 3D model includes encoding each image of the plurality of images with the machine learning model; adjusting, based on the encoded images of the plurality of images, an intrinsics matrix associated with the camera; encoding, based on the intrinsics matrix and pose matrices, the encoding images to back-project into a predefined voxel grid volume; provide the voxel grid with the features as input to a neural network to predicts a 3D model of the location for each voxel in the voxel grid; and extract a 2D surface of the predicted 3D model.

Item 4: The method of any one of the preceding Items, where generating the 3D model includes: encoding each image of the plurality of images with the machine learning model; adjusting, based on the encoded images of the plurality of images, an intrinsics matrix associated with the camera; using the intrinsics matrix and pose matrices to back-project the encoding images into a predefined voxel grid volume; providing the voxel grid with the features as input to a neural network to predict a 3D model of the location for each voxel in the voxel grid; and extracting a 2D surface of the predicted 3D model.

Item 5: The method of any one of the preceding Items, wherein the intrinsics matrix represents physical attributes of a camera, the physical attributes comprising: focal length, principal point, and skew.

Item 6: The method of any one of the preceding Items, where the pose matrix represents a camera's relative or absolute orientation in a virtual world, the pose matrix comprising 3-degrees-of-freedom rotation of the camera and a 3-degrees-of-freedom position in the virtual representation.

Item 7: The method of any one of the preceding Items, where generating the virtual representation with spatially localized metadata includes spatially localizing the metadata using a geometric estimation model, or manual entry of the metadata via a graphical user interface configured to allow a user to hover over or select a particular element and edit the metadata.

Item 8: The method of any one of the preceding Items, wherein spatially localizing of the metadata includes: receiving additional images of the location and associating the additional images to the 3D model of the location; computing camera poses associated with the additional images with respect to the existing plurality of images and the 3D model; and relocalizing, via the geometric estimation model and the camera poses, the additional images and associating the metadata.

Item 9: The method of any one of the preceding Items, further includes displaying metadata about an element when a user hovers over or selects the element within virtual representation of the location.

Item 10: The method of any one of the preceding Items, where the metadata associated with the element comprises at least one of: geometric properties of the element; material specifications of the element; a condition of the element; receipts related to the element; invoices related to the element; spatial measurements captured through the virtual representation or physically at the location; details about insurance coverage; audio, visual, or natural language notes; or 3-dimensional shapes and objects including geometric primitives and CAD models.

Item 11: The method of any one of the preceding Items, where generating the virtual representation with the semantic information includes identifying elements from the plurality of image or the 3D model by a semantically trained machine learning model, the semantically trained machine learning model configured to perform semantic or instance segmentation and 3D object detection and localization of each object in an inputted image.

Item 12: The method of any one of the preceding Items, where generating the virtual representation further includes: estimating, via a pose estimation method and the plurality of images, pose data based on the plurality of images and intrinsics of the camera, obtaining heuristic information associated with one or more standard elements detected within the location, and estimating, based on the heuristic information and geometric correlation between the plurality of images, a scale factor to determine dimensions of the elements within the location.

Item 13: The method of any one of the preceding Items, further includes generating feedback information configured to guide the user to collect additional description data at a particular portion of the location; and updating the virtual representation based on the additional description data collected in response to the feedback information to cause improvements in accuracy and confidence level of the virtual representation.

Item 14: The method of any one of the preceding Items, where generating the feedback information includes generating visual indicators representing confidence levels associated with the elements within the location, wherein a visual indicators having a relatively low confidence level guiding the user to collect additional description data at a particular portion of the location.

Item 15: The method of any one of the preceding Items, where generating the visual indicators includes generating, via a machine learning model or based on number of instances of each element in the plurality of images, a probability map indicating how accurately a particular element is represented in the virtual representation or a 2D representation of the virtual representation.

Item 16: The method of any one of the preceding Items, where updating the virtual representation based on the additional description data includes inputting the additional data to the machine learning model to update the corresponding portion of the virtual representation.

Item 17: The method of any one of the preceding Items, wherein the feedback information is generated in real-time, and the additional data is collected in real-time to update the virtual representation in real-time.

Item 18: The method of any one of the preceding Items, further includes: specifying points of interest within the virtual representation displayed on a graphical user interface; generating, based on the points of interest, a floor plan; and spatially localizing the floor plan on to the virtual representation.

Item 19: The method of any one of the preceding Items, further includes: generating a floor plan of the location by a layout estimation algorithm configured to use lines in the 3D model, plane information related to the elements in the 3D model, vanishing points of the location, or geometric indicators related to the 3D model to estimate the floor plan the location.

Item 20: The method of any one of the preceding Items, where the layout estimation algorithm is further configured to generate or update the floor plan based on constraints and heuristics, the heuristics comprising orthogonal junctions of the location, planar assumptions about a composition of the location, and cuboidal layout assumptions related to the location.

Item 21: The method of any one of the preceding Items, where the layout estimation algorithm includes a neural network configured to generate the floor plan using the lines, planes, points, and geometric indicators as inputs.

Item 22: The method of any one of the preceding Items, where the description data comprises one or more media types, the media types comprising at least one or more of video data, image data, audio data, text data, user interface/display data, and/or sensor data.

Item 23: The method of any one of the preceding Items, where receiving description data comprises receiving sensor data from the one or more environment sensors, the one or more environment sensors comprising at least one of a GPS, an accelerometer, a gyroscope, a barometer, or a microphone.

Item 24: The method of any one of the preceding Items, where description data is captured by a mobile computing device associated with a user and transmitted to the one or more processors with or without a first user and/or other user interaction.

Item 25: The method of any one of the preceding Items, where the description data of the location comprises receiving a real-time video stream of the location.

Item 26: The method of any one of the preceding Items, wherein generating the virtual representation includes: generating or updating the 3D model based on the real-time video stream of the location.

Item 27: The method of any one of the preceding Items, wherein the generating, in real-time, the virtual representation includes receiving, at a user device, the description data of the location, transmitting the description data to a server configured to execute the machine learning model to generate the 3D model of the location, generating, at the server based on the machine learning model and the description data, the virtual representation of the location, and transmitting the virtual representation to the user device.

Item 28: A method to generate a virtual representation of a location with spatially localized information of elements within the location being embedded in the virtual representation, the method includes: receiving description data of a location, the description data being generated via at least one of a camera, a user interface, an environment sensor, and an external location information database, the description data comprising a plurality of images; generating, via a machine learning model and/or a geometric model, a 3-dimensional (3D) representation of the location and elements therein, the machine learning model being configured to receive the plurality of image as input and predict geometry of the location and the elements therein to form the 3D model; obtaining, via a database or a user, heuristic information associated with one or more elements detected within the location, the heuristic information comprising dimension data associated with an element; estimating, based on the heuristic information and geometric correlation between the plurality of images, a scale factor for adjusting sizes of the elements in the images; estimating, based on the scale factor, dimensions of the elements within the location; and updating, based on the estimated scale factor and the estimated dimensions, the virtual representation of the location by adjusting sizes of the elements within the location and annotating the 3D model with estimated dimensions of the elements of the location.

Item 29: A system comprising: at least one programmable processor; and a non-transitory machine-readable medium storing instructions which, when executed by the at least one programmable processor, cause the at least one programmable processor to perform operations comprising those of any of Items 1-28.

Item 30: A non-transitory machine-readable medium storing instructions which, when executed by at least one programmable processor, cause the at least one programmable processor to perform operations comprising those of any of Items 1-28.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system configured to generate a virtual representation of a location with spatially localized information of elements within the location being embedded in the virtual representation, the system comprising one or more hardware processors configured by machine-readable instructions to:
   receive description data of a location, the description data being generated via at least one of a camera, a user interface, an environment sensor, and an external location information database, the description data comprising a plurality of images, and pose matrices;
   receive metadata associated with elements within the location;
   generate, in real-time, via a machine learning model and/or a geometric model, a 3-dimensional (3D) model of the location and the elements therein, the machine learning model being configured to receive the plurality of image and pose matrices as inputs and predict geometry of the location and the elements therein to form the 3D model; and
   generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata;
   wherein generating the 3D model comprises:
   encoding each image of the plurality of images with the machine learning model;
   adjusting, based on the encoded images of the plurality of images, an intrinsics matrix associated with the camera;
   using the intrinsics matrix and pose matrices to back-project the encoded images into a predefined voxel grid volume;
   providing the voxel grid with features as input to a neural network to predict the 3D model of the location for each voxel in the voxel grid; and
   extracting a 2D surface of the predicted 3D model.

2. The system of claim 1, wherein the intrinsics matrix represents physical attributes of a camera, the physical attributes comprising: focal length, principal point, and skew.

3. The system of claim 1, wherein the pose matrix represents a camera's relative or absolute orientation in a virtual world, the pose matrix comprising 3-degrees-of-freedom rotation of the camera and a 3-degrees-of-freedom position in the virtual representation.

4. The system of claim 1, wherein generating the virtual representation with spatially localized metadata comprises:
   spatially localizing the metadata using a geometric estimation model, or manual entry of the metadata via a graphical user interface configured to allow a user to hover over or select a particular element and edit the metadata.

5. The system of claim 4, wherein spatially localizing of the metadata comprises:
   receiving additional images of the location and associating the additional images to the 3D model of the location;
   computing camera poses associated with the additional images with respect to the plurality of images and the 3D model; and
   relocalizing, via the geometric estimation model and the camera poses, the additional images and associating the metadata.

6. The system of claim 1, further comprising instructions to:
   display metadata about an element when a user hovers over or selects the element within virtual representation of the location.

7. The system of claim 1, wherein metadata associated with an element comprises at least one of: geometric properties of the element; material specifications of the element; a condition of the element; receipts related to the element; invoices related to the element; spatial measurements captured through the virtual representation or physically at the location; details about insurance coverage; audio, visual, or natural language notes; or 3D shapes and objects including geometric primitives and CAD models.

8. The system of claim 1, wherein generating the virtual representation with the semantic information comprises:
identifying elements from the plurality of image or the 3D model by a semantically trained machine learning model, the semantically trained machine learning model configured to perform semantic or instance segmentation and 3D object detection and localization of each object in an input image.

9. A system configured to generate a virtual representation of a location with spatially localized information of elements within the location being embedded in the virtual representation, the system comprising one or more hardware processors configured by machine-readable instructions to:
receive description data of a location, the description data being generated via at least one of a camera, a user interface, an environment sensor, and an external location information database, the description data comprising a plurality of images, and pose matrices;
receive metadata associated elements within the location;
generate, in real-time, via a machine learning model and/or a geometric model, a 3-dimensional (3D) model of the location and elements therein, the machine learning model being configured to receive the plurality of image and pose matrices as inputs and predict geometry of the location and the elements therein to form the 3D model; and
generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata;
wherein generating the virtual representation further comprises:
estimating, via a pose estimation method and the plurality of images, pose data based on the plurality of images and intrinsics of the camera,
obtaining heuristic information associated with one or more standard elements detected within the location, and
estimating, based on the heuristic information and geometric correlation between the plurality of images, a scale factor to determine dimensions of the elements within the location.

10. The system of claim 9, further comprising instructions to:
generate feedback information configured to guide the user to collect additional description data at a particular portion of the location; and
update the virtual representation based on the additional description data collected in response to the feedback information to cause improvements in accuracy and confidence level of the virtual representation.

11. A system configured to generate a virtual representation of a location with spatially localized information of elements within the location being embedded in the virtual representation, the system comprising one or more hardware processors configured by machine-readable instructions to:
receive description data of a location, the description data being generated via at least one of a camera, a user interface, an environment sensor, and an external location information database, the description data comprising a plurality of images, and pose matrices;
receive metadata associated elements within the location;
generate, in real-time, via a machine learning model and/or a geometric model, a 3-dimensional (3D) model of the location and elements therein, the machine learning model being configured to receive the plurality of image and pose matrices as inputs and predict geometry of the location and the elements therein to form the 3D model;
generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata;
generate feedback information configured to guide the user to collect additional description data at a particular portion of the location; and
update the virtual representation based on the additional description data collected in response to the feedback information to cause improvements in accuracy and confidence level of the virtual representation,
wherein generating the feedback information comprises:
generating visual indicators representing confidence levels associated with the elements within the location, wherein visual indicators having a relatively low confidence level guide the user to collect additional description data at a particular portion of the location.

12. The system of claim 11, wherein generating the visual indicators comprises:
generating, via a machine learning model or based on a number of instances of each element in the plurality of images, a probability map indicating how accurately a particular element is represented in the virtual representation or a 2D representation of the virtual representation.

13. The system of claim 11, wherein updating the virtual representation based on the additional description data comprises:
inputting the additional data to the machine learning model to update a corresponding portion of the virtual representation.

14. The system of claim 11, wherein the feedback information is generated in real-time, and the additional data is collected in real-time to update the virtual representation in real-time.

15. The system of claim 11, further comprising instructions to:
specify points of interest within the virtual representation displayed on a graphical user interface;
generate, based on the points of interest, a floor plan; and
spatially localize the floor plan on to the virtual representation.

16. A system configured to generate a virtual representation of a location with spatially localized information of elements within the location being embedded in the virtual representation, the system comprising one or more hardware processors configured by machine-readable instructions to:
receive description data of a location, the description data being generated via at least one of a camera, a user interface, an environment sensor, and an external location information database, the description data comprising a plurality of images, and pose matrices;
receive metadata associated elements within the location;
generate, in real-time, via a machine learning model and/or a geometric model, a 3-dimensional (3D) model of the location and elements therein, the machine learning model being configured to receive the plurality of image and pose matrices as inputs and predict geometry of the location and the elements therein to form the 3D model;

generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata; and generate a floor plan of the location by a layout estimation algorithm configured to use lines in the 3D model, plane information related to the elements in the 3D model, vanishing points of the location, or geometric indicators related to the 3D model to estimate the floor plan of the location.

17. The system of claim 16, wherein the layout estimation algorithm is further configured to generate or update the floor plan based on constraints and heuristics, the heuristics comprising orthogonal junctions of the location, planar assumptions about a composition of the location, and cuboidal layout assumptions related to the location.

18. The system of claim 17, wherein the layout estimation algorithm includes a neural network configured to generate the floor plan using the lines, planes, points, and geometric indicators as inputs.

19. The system of claim 16, wherein the description data comprises one or more media types, the media types comprising at least one or more of video data, image data, audio data, text data, user interface/display data, and/or sensor data.

20. The system of claim 16, wherein receiving description data comprises receiving sensor data from the one or more environment sensors, the one or more environment sensors comprising at least one of a GPS, an accelerometer, a gyroscope, a barometer, or a microphone.

21. The system of claim 16, wherein description data is captured by a mobile computing device associated with a user and transmitted to the one or more processors with or without a first user and/or other user interaction.

22. The system of claim 16, wherein the description data of the location comprises receiving a real-time video stream of the location.

23. The system of claim 22, wherein generating the virtual representation comprises:
    generating or updating the 3D model based on the real-time video stream of the location.

24. The system of claim 16, wherein the generating, in real-time, the virtual representation comprises:
    receiving, at a user device, the description data of the location,
    transmitting the description data to a server configured to execute the machine learning model to generate the 3D model of the location,
    generating, at the server based on the machine learning model and the description data, the virtual representation of the location, and
    transmitting the virtual representation to the user device.

25. A system configured to generate a virtual representation of a location with spatially localized information of elements within the location being embedded in the virtual representation, the system comprising one or more hardware processors configured by machine-readable instructions to:
    receive description data of a location, the description data being generated via at least one of a camera, a user interface, an environment sensor, and an external location information database, the description data comprising a plurality of images, and pose matrices;
    receive metadata associated elements within the location;
    generate, via a machine learning model and/or a geometric model, a 3-dimensional (3D) model of the location and elements therein, the machine learning model being configured to receive the plurality of image and pose matrices as inputs and predict geometry of the location and the elements therein to form the 3D model; and
    generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata;
    wherein generating the 3D model comprises:
    encoding each image of the plurality of images with the machine learning model;
    adjusting, based on the encoded images of the plurality of images, an intrinsics matrix associated with the camera;
    using the intrinsics matrix and pose matrices to back-project the encoded images into a predefined voxel grid volume;
    provide the voxel grid with features as input to a neural network to predict the 3D model of the location for each voxel in the voxel grid; and
    extract a 2D surface of the predicted 3D model.

26. The system of claim 25, wherein generating the virtual representation comprises:
    generating or updating the 3D model based on a real-time video stream of the location.

27. The system of claim 26, wherein the generating the virtual representation comprises, in real-time:
    receiving, at a user device, the description data of the location,
    transmitting the description data to a server configured to execute the machine learning model to generate the 3D model of the location,
    generating, at the server based on the machine learning model and the description data, the virtual representation of the location, and
    transmitting the virtual representation to the user device.

28. The system of claim 25, further comprising estimating intrinsics and extrinsics camera parameters using a structure from motion (SFM) algorithm.

29. A system configured to generate a virtual representation of a location with spatially localized information of elements within the location being embedded in the virtual representation, the system comprising one or more hardware processors configured by machine-readable instructions to:
    receive description data of a location, the description data being generated via at least one of a camera, a user interface, an environment sensor, and an external location information database, the description data comprising a plurality of images, and pose matrices;
    receive metadata associated elements within the location;
    generate, in real-time, via a machine learning model and/or a geometric model, a 3-dimensional (3D) model of the location and elements therein, the machine learning model being configured to receive the plurality of image and pose matrices as inputs and predict geometry of the location and the elements therein to form the 3D model;
    generate, based on the 3D model of the location, a virtual representation of the location by annotating the 3D model with spatially localized metadata associated with the elements within the location, and semantic information of the elements within the location, the virtual representation being editable by a user to allow modifications to the spatially localized metadata;

obtain, via a database or a user, heuristic information associated with one or more elements detected within the location, the heuristic information comprising dimension data associated with an element;

estimate, based on the heuristic information and geometric correlation between the plurality of images, a scale factor for adjusting sizes of the elements in the images;

estimate, based on the scale factor, dimensions of the elements within the location; and update, based on the estimated scale factor and the estimated dimensions, the virtual representation of the location by adjusting sizes of the elements within the location and annotating the 3D model with estimated dimensions of the elements of the location.

30. The system of claim 29, further comprising instructions to:
estimate the pose matrices and intrinsics for each image of the plurality of images by a geometric reconstruction framework configured to triangulate 3D points based on the plurality of images to estimate both camera poses up to scale and camera intrinsics, and
input the pose matrices and intrinsics to the machine learning model to accurately predict the 3D model of the location.

31. The system of claim 30, wherein the geometric reconstruction framework comprises at least one of: structure-from-motion (SFM), multi-view stereo (MVS), or simultaneous localization and mapping (SLAM).

32. The system of claim 29, further comprising instructions to:
estimate metric depth maps for each image of the plurality of images, and
input the depth maps to the machine learning model to accurately predict the 3D model of the location.

* * * * *